(12) United States Patent
Lundsgaard et al.

(10) Patent No.: US 10,771,922 B2
(45) Date of Patent: *Sep. 8, 2020

(54) DETECTION OF MOBILE DEVICE LOCATION WITHIN VEHICLE USING VEHICLE BASED DATA AND MOBILE DEVICE BASED DATA

(71) Applicant: Allstate Insurance Company, Northbrook, IL (US)

(72) Inventors: Soren K. Lundsgaard, Inverness, IL (US); Dana Ferguson, Chicago, IL (US); Jared S. Snyder, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/245,597

(22) Filed: Jan. 11, 2019

(65) Prior Publication Data

US 2019/0166474 A1    May 30, 2019

Related U.S. Application Data

(62) Division of application No. 15/066,406, filed on Mar. 10, 2016, now Pat. No. 10,219,116.

(51) Int. Cl.
*H04W 4/02* (2018.01)
*H04W 4/48* (2018.01)
(Continued)

(52) U.S. Cl.
CPC ............ *H04W 4/027* (2013.01); *G01C 21/10* (2013.01); *G01S 19/05* (2013.01); *G01S 19/14* (2013.01); *H04W 4/40* (2018.02); *H04W 4/48* (2018.02)

(58) Field of Classification Search
CPC ........ G01S 19/10; G01S 19/05; G01S 13/931; G01S 17/936; G01S 2013/936;
(Continued)

(56) References Cited

U.S. PATENT DOCUMENTS 8,731,530 B1    5/2014 Breed et al.
2003/0225707 A1*    12/2003 Ehrman .................. G06Q 10/08
705/64
(Continued)

FOREIGN PATENT DOCUMENTS

WO          13040493 A1    3/2013

OTHER PUBLICATIONS

He et al., Who Sits Where? Infrastructure-Free In-Vehicle Cooperative Positioning via Smartphones, Sensors 2014, 14, 11605-11628; doi:10.3390/s140711605 (Year: 2014).*

(Continued)

*Primary Examiner* — George Eng
*Assistant Examiner* — Jung Gao
(74) *Attorney, Agent, or Firm* — Banner & Witcoff, Ltd.

(57) ABSTRACT

One or more location analysis computing devices, methods, and computer-readable media are disclosed herein for determining the position of a mobile device (smartphone, tablet computer) within an interior of a vehicle. The position of the mobile device may be calculated by detecting changes in accelerometer data. The accelerometer data may first need to be translated to determine corresponding axes, since the device may not be right side up (e.g., in a pocket). The vehicle may travel over road discontinuities such as bumps, and calculating the position of the mobile device may be based on the different magnitude and angle resulting from a first tire and a second tire hitting the bump. Data from vehicle sensors or other mobile device sensors may also be used in the calculating. Once the position is determined,
(Continued)

commands may be sent to the mobile device to deactivate certain functionality, or to a remote server for further processing.

18 Claims, 11 Drawing Sheets

(51) Int. Cl.
*G01S 19/14* (2010.01)
*G01C 21/10* (2006.01)
*H04W 4/40* (2018.01)
*G01S 19/05* (2010.01)

(58) Field of Classification Search
CPC ....... G01S 2013/9389; G01S 2015/938; G01S 19/42; G01S 19/52; G01S 2007/4034; G06F 3/0414; H04W 4/008; H04W 4/021; H04W 4/046; H04W 64/006; H04W 4/027; H04W 4/023; H04W 4/026
See application file for complete search history.

(56) References Cited

U.S. PATENT DOCUMENTS

| | | |
|---|---|---|
| 2005/0046580 A1 | 3/2005 | Miranda-Knapp et al. |
| 2009/0192688 A1 | 7/2009 | Padmanabhan et al. |
| 2011/0117903 A1 | 5/2011 | Bradley |
| 2012/0268235 A1 | 10/2012 | Farhan et al. |
| 2013/0210405 A1 | 8/2013 | Whipple et al. |
| 2014/0149145 A1 | 5/2014 | Peng et al. |
| 2014/0180730 A1* | 6/2014 | Cordova .............. H04W 4/029 705/4 |
| 2014/0207309 A1 | 7/2014 | Armitage et al. |
| 2014/0287738 A1* | 9/2014 | Abramson ............. H04L 67/12 455/418 |
| 2014/0324338 A1 | 10/2014 | Paim et al. |
| 2015/0071090 A1 | 3/2015 | Mohammed et al. |
| 2015/0120149 A1* | 4/2015 | Worrel ................. A61M 21/02 701/49 |
| 2015/0154868 A1 | 6/2015 | Neuner et al. |
| 2015/0170058 A1 | 6/2015 | Fu |
| 2015/0382156 A1 | 12/2015 | Gruteser et al. |

OTHER PUBLICATIONS

Homin Park, et al. "Are you driving?: non-intrusive driver detection using built-in smartphone sensors", ResearchGate, Sep. 2014.
Jie Yang, et al. "Detecting Driver Phone Use Leveraging Car Speakers", MobiCom '11, Sep. 19-23, 2011, Las Vegas, NV.
Hon Chu, et al. "I am a Smartphone and I Know My User is Driving".
Hon Lung Chu, "In-Vehicle Driver Detection Using Mobile Phone Sensors", Duke ECE, Apr. 20, 2011.
Yan Wang, et al., "Sensing Vehicle Dynamics for Determining Driver Phone Use", MobiSys '13, Jun. 25-28, 2013, Tiapai, Tiawan.
Cheng Bo, et al., "TEXIVE: Detecting Drivers Using Personal Smart Phones by Leveraging Inertial Sensors".
Zongjian He, et al., "Who Sits Where? Infrastructure-Free In-Vehicle Cooperative Positioning via Smartphones", Sensors 2014, ISSN 1424-8220, Jun. 30, 2014.
Jun. 16, 2017—U.S. Non-Final Office Action—U.S. Appl. No. 15/066,406.
Jun. 1, 2017—(WO) International Search Report & Written Opinion—PCT/US17/21609.
Nov. 30, 2017—U.S. Final Office Action—U.S. Appl. No. 15/066,406.
Apr. 5, 2018—U.S. Non-Final Office Action—U.S. Appl. No. 15/066,406.
Oct. 17, 2018—U.S. Notice of Allowance—U.S. Appl. No. 15/066,406.
May 7, 2019—(CA) Office Action—Application No. 3,016,599.
Nov. 8, 2019—(EP) Extended European Search Report—Application No. 17764116.4.
Jie Yang, et al., "Sensing Driver Phone Use with Acoustic Ranging through Car Speakers", IEEE Transactions on Mobile Computing, IEEE Service Center, Los Alamitos, CA, US, vol. 11, No. 9, Sep. 1, 2012, pp. 1426-1440, XP011470182, ISSN 1536-1233, DOI: 10.1109/TMC.2012.92.

\* cited by examiner

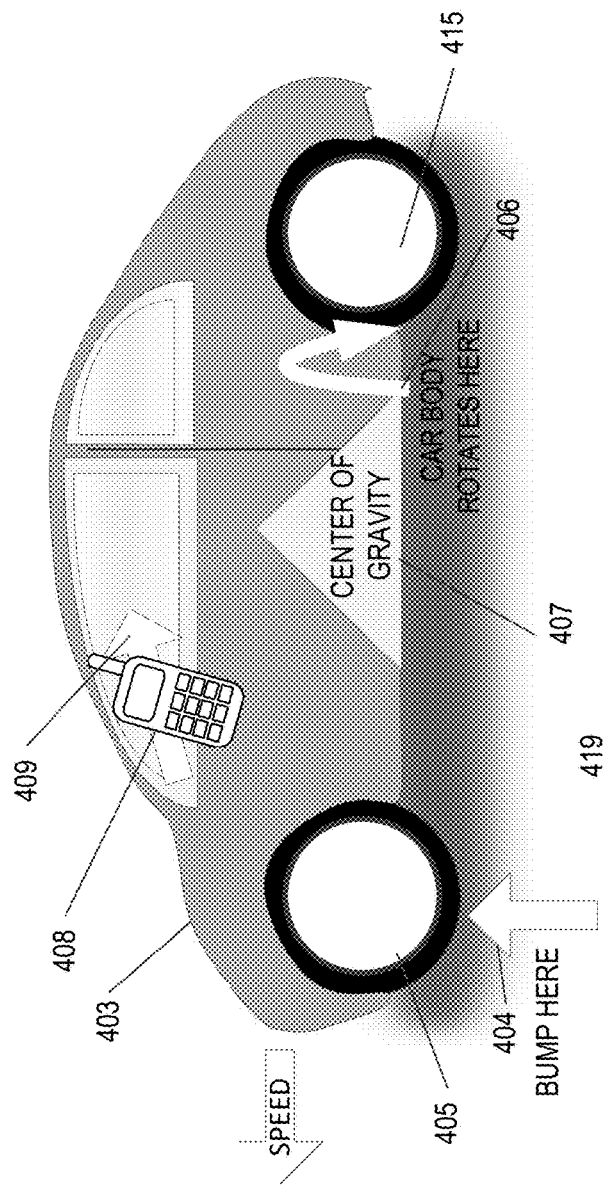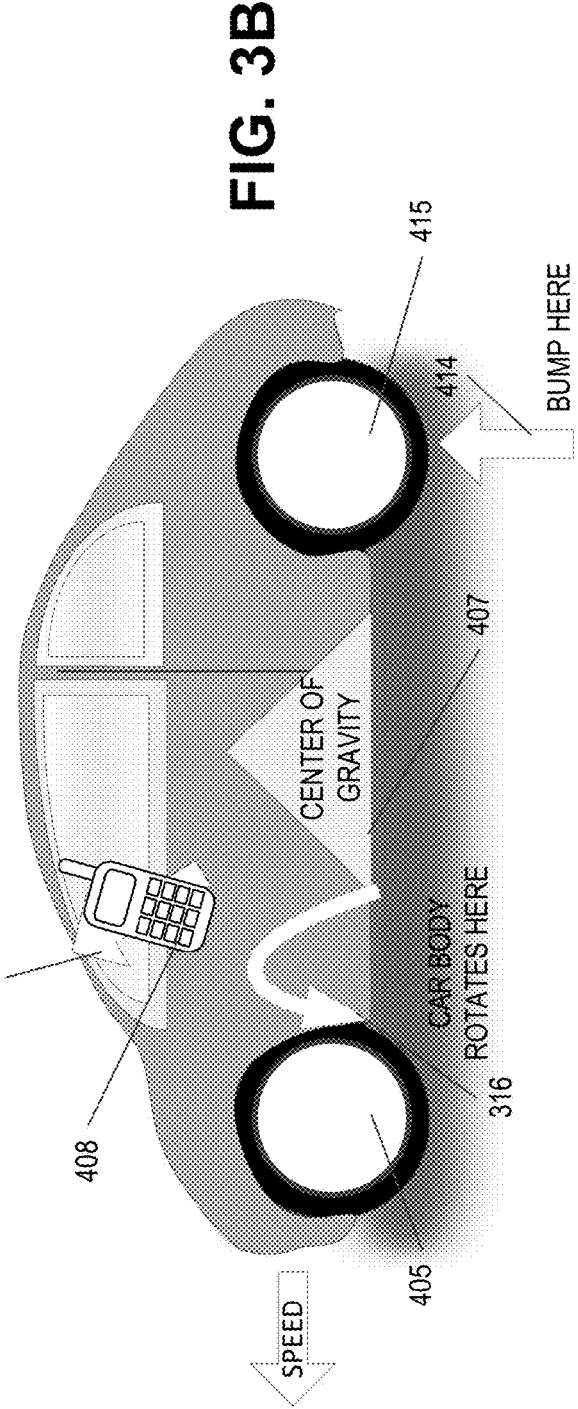

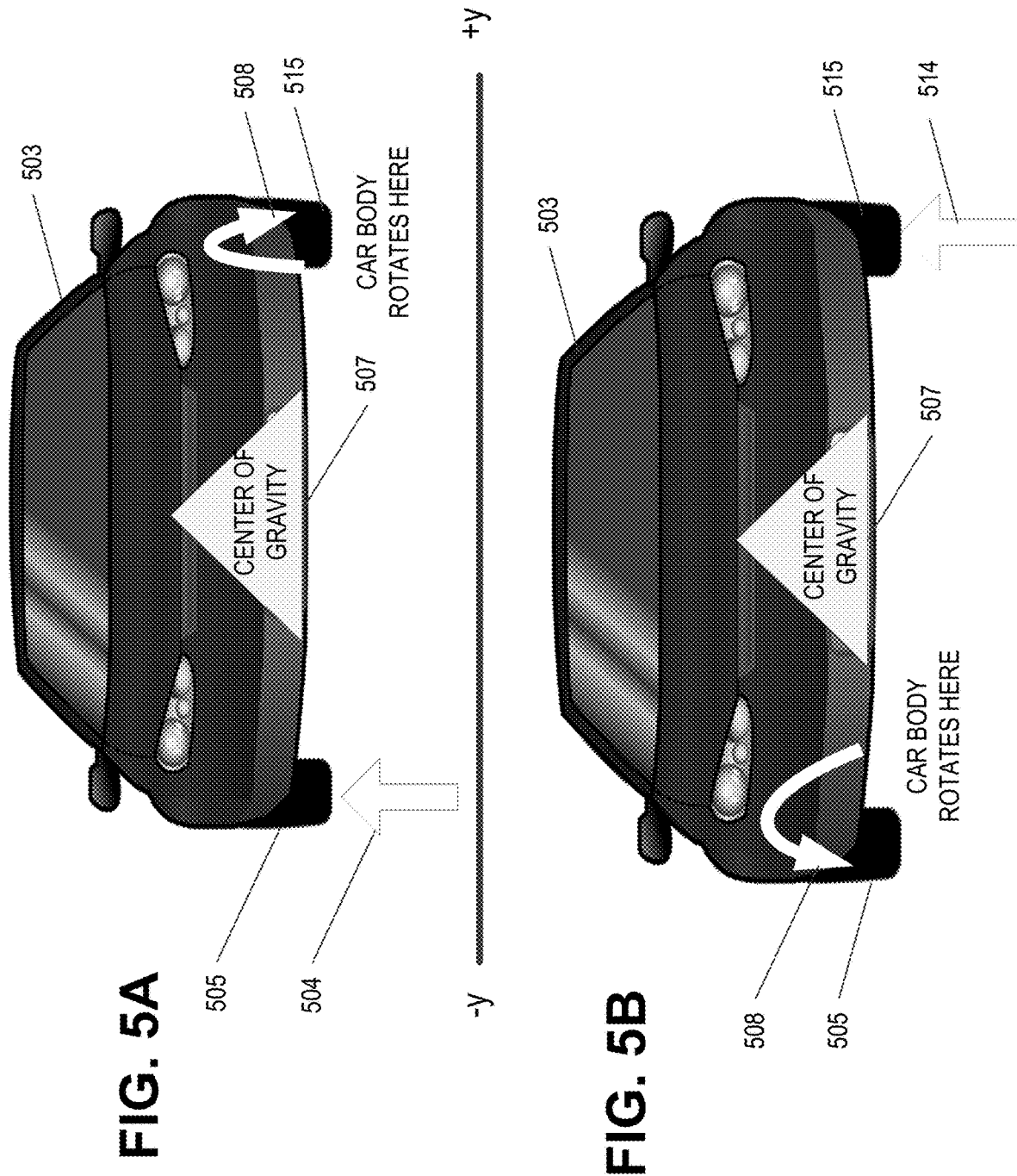

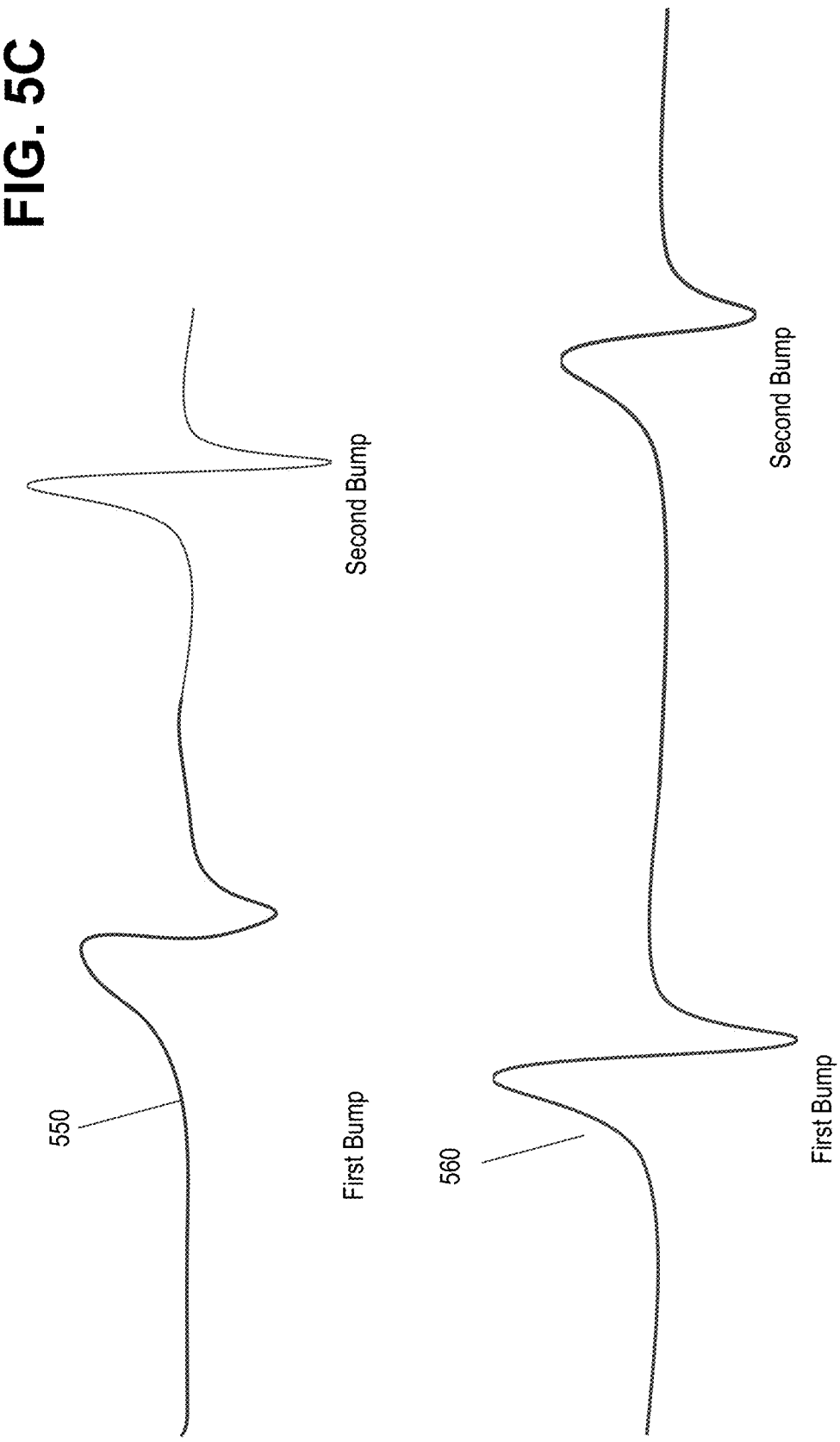

DETECTION OF MOBILE DEVICE LOCATION WITHIN VEHICLE USING VEHICLE BASED DATA AND MOBILE DEVICE BASED DATA

CROSS REFERENCE TO RELATED APPLICATIONS

This application is a divisional of and claims priority to U.S. patent application Ser. No. 15/066,406 filed Mar. 10, 2016, and entitled "Detection of Mobile Device Location Within Vehicle Using Vehicle Based Data and Mobile Device Based Data," the content of which is incorporated herein by reference in its entirety.

TECHNICAL FIELD

Aspects of the disclosure generally relate to the analysis of vehicle data and accelerometer data. In particular, various aspects of the disclosure relate to receiving and transmitting vehicular data and accelerometer data and analyzing the data to detect an approximate location of an accelerometer within the vehicle.

BACKGROUND

The combined operation of vehicles and mobile devices creates many concerns and challenges. Driving a vehicle while operating a mobile device creates hazardous and unsafe conditions for the driver, for their passengers, and for the public. Even "hands-free" modes where the driver does not physically interact with the mobile device have, in some research, been shown to create distracted driving situations. Although many people are aware of the negatives of using a mobile device while driving, various psychological, societal, and behavioral factors play into continued operation of mobile devices while driving, even in jurisdictions where the operation of hand-held mobile devices while driving has been outlawed.

Given that individual users require more than mere willpower to discontinue the usage of their mobile devices while driving, technical solutions have been proposed to identify situations in which a mobile device is being operated within a moving vehicle. Mobile devices such as smartphones, personal digital assistants, tablet computers, and the like, may include movement sensors, such as an accelerometer, gyroscope, speedometer, and/or Global Positioning System (GPS) receivers, capable of detecting movement. Previously proposed solutions largely have involved processing accelerometer data from the accelerometer onboard the mobile device and/or data from a geolocation service (e.g., GPS). From this data, excessive movement or velocity may indicate the mobile device is being operated in a vehicle, and functionality of the mobile device may be disabled or notifications may be presented to the user warning them to discontinue operation of the mobile device while the vehicle is in motion. As may be expected, these solutions have yet to be widely implemented, because they do not address a side consideration of the permissible use of a mobile device by a non-driver. In other words, these proposed solutions cut off or restrict usage by passengers, who should be free to operate a mobile device within the vehicle without constant reminders or limited functionality.

Additionally, in some situations, it may be advantageous or beneficial to the vehicular occupants to enable full operation of the mobile device. As discussed above, a passenger may be operating the mobile device, and repeated notifications may be annoying. As another example, a user may be using a mobile device as a navigational aid, and the disabling of functionality may cause more harm than good as the user may become distracted if their route guidance is suspended or terminated.

Separately, many vehicles include sophisticated sensors and advanced internal computer systems designed to monitor and control vehicle operations and driving functions. Vehicle-based computer systems, such as on-board diagnostics (OBD) systems and telematics devices, may be used in automobiles and other vehicles, and may be capable of collecting various driving data and vehicle sensor data. For example, OBD systems may receive information from the vehicle's on-board computers and sensors in order to monitor a wide variety of information relating to the vehicle systems, such as engine RPM, emissions control, vehicle speed, throttle position, acceleration and braking rates, use of driver controls, etc. Vehicles may also include Global Positioning System (GPS) receivers and devices installed within or operating at the vehicle configured to collect vehicle location and time data.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

An advantageous solution to the problems presented above, and other issues which will be apparent upon the reading of the present disclosure, may be to determine a location of the smartphone within the interior of the vehicle, and disable device functionality or take other action based on the determined location. To do so, it may be desirable to process data received from the sensors of the mobile device (e.g., the gyroscope of the mobile device, the accelerometer of the mobile device) in combination with data received via the OBD system of the vehicle. The OBD system may provide additional information such as the vehicle speed, acceleration and braking rates, and in some vehicles, information such as input from the steering wheel (e.g., the user is making a left turn or right turn). Additionally, the OBD system may provide accelerometer information from an accelerometer aboard the vehicle other than the accelerometer of the mobile device, if such a vehicle-accelerometer is installed as a default option or as a post-market addition. Comparisons between the two accelerometers may be useful for determining the location of the mobile device within the vehicle.

For example, the vehicle may encounter an imperfection or discontinuity in the road surface (e.g., a bump, pothole, lane marker, or the like). A front tire of the vehicle may encounter the road-surface discontinuity, and data from the encounter (the jolt felt in the car) may be recorded by the vehicle processor. As an example, a bump in the road may be felt by an accelerometer located at the front wheel (e.g., in the rim) and/or via an accelerometer fixedly located within the vehicle interior. The bump may then be recorded by the accelerometer of a mobile device traveling within the interior of the vehicle. The differences in magnitude along each axis of movement between the bumps may assist in determining the location of the mobile device. In some situations, the vehicle (and the mobile device) may experience the bump again by the rear tire encountering the same road surface imperfection. This additional information may be used to calculate further differences in magnitude along each axis of movement between the vehicle-accelerometer and the device-accelerometer, which also may assist in determining the location of the mobile device within the vehicle.

Accordingly, aspects of the disclosure relate to determining, by a computing device, the approximate location of a mobile device (e.g., smartphone, tablet) within an interior of a vehicle. For example, aspects of the present disclosure include a location analysis computing device which includes a processing unit comprising at least one processor and a memory unit storing computer-executable instructions. The instructions may, when executed by the processing unit, cause the location analysis computing device to receive first mobile device sensor data collected by mobile device sensors of a mobile device located within a vehicle. The sensor data may include X-axis accelerometer data, Y-axis accelerometer data, and Z-axis accelerometer data in the first mobile device's reference frame. The processing unit may translate the first mobile device sensor data into X-axis accelerometer data, Y-axis accelerometer data, and Z-axis accelerometer data in the vehicle's reference frame. Based on the translated data, the processing unit may detect a first occurrence of an event (such as a tire of the vehicle hitting a bump). Detecting the event may include determining that a change in magnitude of the vehicle-frame Z-axis accelerometer data exceeds a predetermined threshold. The processing unit may calculate a first event vector comprising a first event magnitude and a first event angle based on the detected event, determine a position of the mobile device within the vehicle based on the calculated first event vector.

In accordance with further aspects of the present disclosure, a method disclosed herein includes receiving first mobile device sensor data collected by mobile device sensors of a mobile device located within a vehicle, the first mobile device sensor data including first-axis accelerometer data, second-axis accelerometer data, and third-axis accelerometer data. The method may include translating the first mobile device sensor data into X-axis accelerometer data, Y-axis accelerometer data, and Z-axis accelerometer data, resulting in translated data. The method may include detecting, by a computing device, a first occurrence of an event in the translated data, wherein detecting the event comprises determining that a change in magnitude of the Z-axis accelerometer data exceeds a predetermined threshold. The computing device may calculate a first event vector comprising a first event magnitude and a first event angle based on the detected event and determine a position of the mobile device within the vehicle based on the calculated first event vector.

In accordance with further aspects of the present disclosure, a location analysis apparatus may be provided. The location analysis apparatus may include a processing unit comprising at least one processor and a memory unit storing computer-executable instructions. The instructions may, when executed by the processing unit, cause the location analysis computing device to receive first vehicle sensor data collected by sensors of a vehicle. The first vehicle sensor data may include first-axis accelerometer data, second-axis accelerometer data, and third-axis accelerometer data. The processing unit may translate the vehicle sensor data into X-axis accelerometer data, Y-axis accelerometer data, and Z-axis accelerometer data, and may detect a first occurrence of an event in the translated data. Detecting the event may include determining a change in magnitude of the Z-axis accelerometer data exceeds a predetermined threshold. The processing unit may receive mobile device sensor data collected by mobile device sensors of a mobile device located within the vehicle, which may include further accelerometer data. The processing unit may calculate a first event vector comprising a first event magnitude and a first event angle based on the detected event and a second event vector comprising a second event magnitude and a second event angle based on the further accelerometer data. Based on the calculated first event vector and second event vector, the processing unit may determine a position of the mobile device within the vehicle.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIGS. 3A and 3B illustrate various aspects of vehicles and devices therein as they encounter road discontinuities (e.g., bumps), which may be analyzed according to one or more aspects of the present disclosure.

FIGS. 5A and 5B illustrate various aspects of vehicles and devices therein as they encounter bumps at speed, which may be analyzed according to one or more aspects of the present disclosure.

FIG. 5C illustrates various aspects of graphed data resulting from a vehicular encounter with a bump, which may be analyzed according to one or more aspects of the present disclosure.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a specially-programmed computer system, or a computer program product.

Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
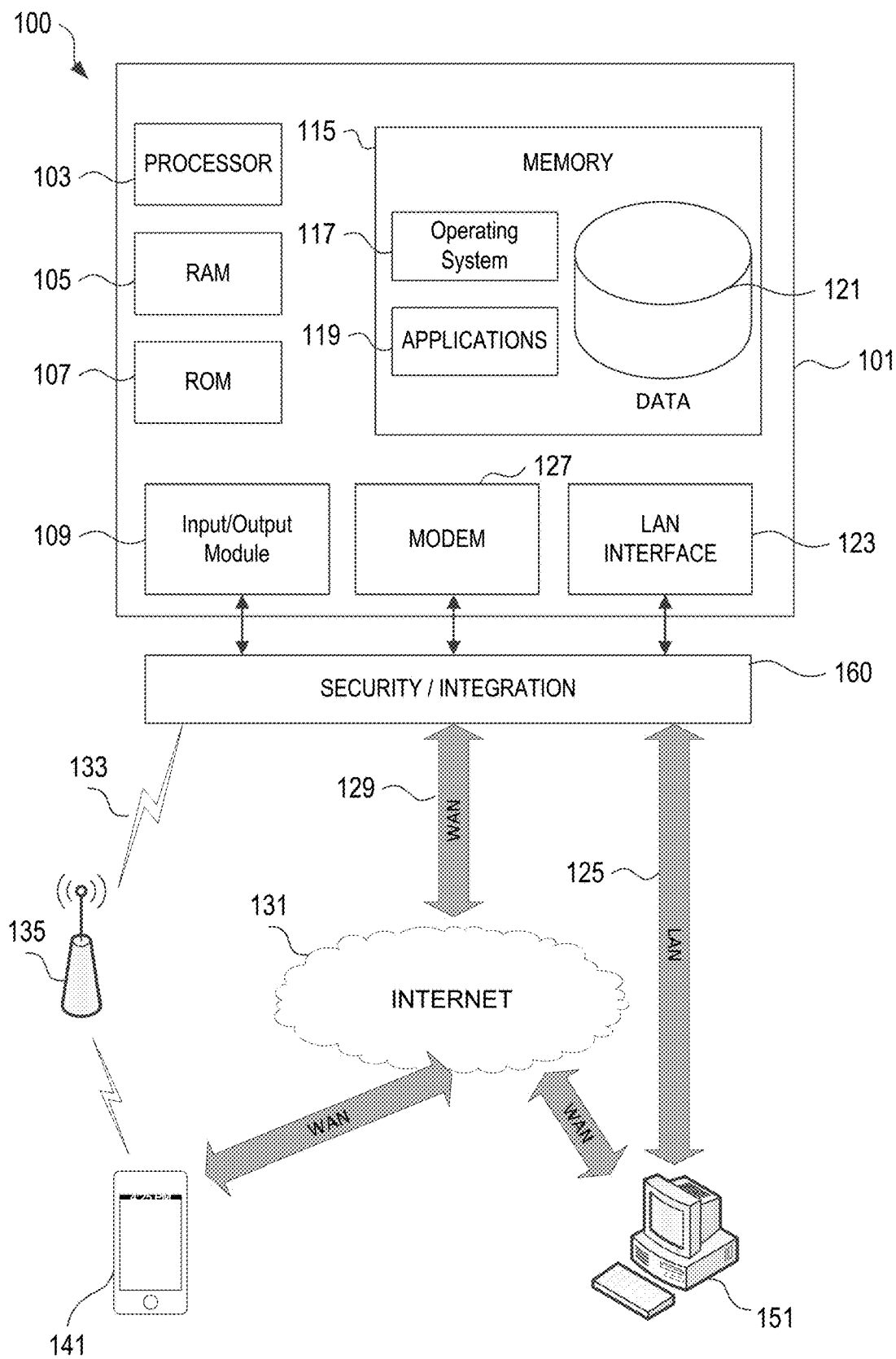
FIG. 1 illustrates a network environment and computing systems that may be used to implement aspects of the disclosure.

FIG. 1 illustrates a block diagram of a mobile device locating computing device 101 in a mobile device location and configuration system 100 that may be used according to one or more illustrative embodiments of the disclosure. The mobile device locating computing device 101 may have a processor 103 for controlling overall operation of the mobile device locating computing device 101 and its associated components, including RAM 105, ROM 107, input/output module 109, and memory 115. The computing device 101, along with one or more additional devices (e.g., terminals 141, 151) may correspond to any of multiple systems or devices, such as mobile computing devices (e.g., smartphones, smart terminals, tablets, and the like) and vehicular-based computing devices, configured as described herein for transmitting and receiving mobile-device-originated data, and vehicle-originated-data.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the mobile device locating computing device 101, such as an operating system 117, application programs 119, and an associated internal database 121. Processor 103 and its associated components may allow the computing device 101 to execute a series of computer-readable instructions to transmit or receive vehicle driving data, analyze driving data and identify driving behaviors or driving actions.

The mobile device locating computing device 101 may operate in a networked environment supporting connections to one or more remote computers, such as terminals/devices 141 and 151. Mobile device locating computing device 101, and related terminals/devices 141 and 151, may include devices installed in vehicles, mobile devices that may travel within vehicles, or devices outside of vehicles that are configured to receive and process vehicle and driving data. Thus, the mobile device locating computing device 101 and terminals/devices 141 and 151 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, and the like), and may include some or all of the elements described above with respect to the computing device 101.

The network connections depicted in FIG. 1 include a local area network (LAN) 125 and a wide area network (WAN) 129, and a wireless telecommunications network 133, but may also include other networks. When used in a LAN networking environment, the mobile device locating computing device 101 may be connected to the LAN 125 through a network interface or adapter 123. When used in a WAN networking environment, the mobile device locating computing device 101 may include a modem 127 or other means for establishing communications over the WAN 129, such as network 131 (e.g., the Internet). When used in a wireless telecommunications network 133, the mobile device locating computing device 101 may include one or more transceivers, digital signal processors, and additional circuitry and software for communicating with wireless computing devices 141 (e.g., mobile phones, short-range vehicle communication systems, vehicle telematics devices) via one or more network devices 135 (e.g., base transceiver stations) in the wireless network 133. It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and mobile device location and configuration system components described herein may be configured to communicate using any of these network protocols or technologies.

Also illustrated in FIG. 1 is a security and integration layer 160, through which communications may be sent and managed between the device 101 (e.g., a user's personal mobile device, a vehicle-based system, external server, etc.) and the remote devices (141 and 151) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the mobile device locating computing device 101. As an example, a security and integration layer 160 of a mobile computing device, vehicle-based device, or a server operated by an insurance provider, financial institution, governmental entity, or other organization, may comprise a set of web application servers configured to use secure protocols and to insulate the server 101 from external devices 141 and 151. In some cases, the security and integration layer 160 may correspond to a set of dedicated hardware and/or software operating at the same physical location and under the control of same entities as mobile device locating computing device 101. For example, layer 160 may correspond to one or more dedicated web servers and network hardware in an organizational datacenter or in a cloud infrastructure supporting a cloud-based mobile device location and configuration system. In other examples, the security and integration layer 160 may correspond to separate hardware and software components which may be operated at a separate physical location and/or by a separate entity.

As discussed below, the data transferred to and from various devices in device location and configuration system 100 may include secure and sensitive data, such as driving data, driving locations, vehicle data, and confidential individual data such as insurance data and medical data associated with vehicle occupants. In at least some examples, transmission of the data may be performed based on one or more user permissions provided. Therefore, it may be desirable to protect transmissions of such data by using secure network protocols and encryption, and also to protect the integrity of the data when stored on in a database or other storage in a mobile device, analysis server, or other computing devices in the device location and configuration system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in the mobile device location and configuration system 100. Data may be transmitted through the security and integration layer 160, using various network communication protocols. Secure data transmission protocols and/or encryption may be used in file transfers to protect to integrity of the driving data, for example, File Transfer Protocol (FTP), Secure File Transfer Protocol (SFTP), and/or Pretty Good Privacy (PGP) encryption.

In other examples, one or more web services may be implemented within the various mobile device locating computing devices 101 in the device location and configuration system 100 and/or the security and integration layer 160. The web services may be accessed by authorized external devices and users to support input, extraction, and manipulation of the data (e.g., driving data, location data, confidential personal data, etc.) between the various mobile device locating computing devices 101 in the device location and configuration system 100. Web services built to support the device location and configuration system 100 may be cross-domain and/or cross-platform, and may be built for enterprise use. Such web services may be developed in accordance with various web service standards, such as the Web Service Interoperability (WS-I) guidelines. In some examples, a movement data and/or driving data web service may be implemented in the security and integration layer 160 using the Secure Sockets Layer (SSL) or Transport Layer Security (TLS) protocol to provide secure connections between servers (e.g., mobile device locating computing devices 101) and various clients 141 and 151 (e.g., mobile devices, data analysis servers, etc.). SSL or TLS may use HTTP or HTTPS to provide authentication and confidentiality.

In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in device location and configuration system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a driving database, a vehicle database, insurance customer database, etc.) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of retrieving driving, vehicle data, and individual data, such as faster response times and less dependence on network conditions when transmitting/receiving accident detection and recovery software applications (or application updates), driving data, vehicle and occupant data, etc.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and system components described herein may be configured to communicate using any of these network protocols or technologies.

Additionally, one or more application programs 119 may be used by the various mobile device locating computing devices 101 within a device location and configuration system 100 (e.g., device location software applications, device configuration software applications, and the like), including computer executable instructions for receiving and storing data from vehicle-based systems, and/or mobile computing devices, analyzing the data to determine a potential location of a mobile computing device in relation to a vehicle, retrieving various vehicle data and individual data relating to the vehicle occupants, determining and configuring the mobile computing device based on the retrieved and analyzed data, and/or performing other related functions as described herein.

Figure 2:
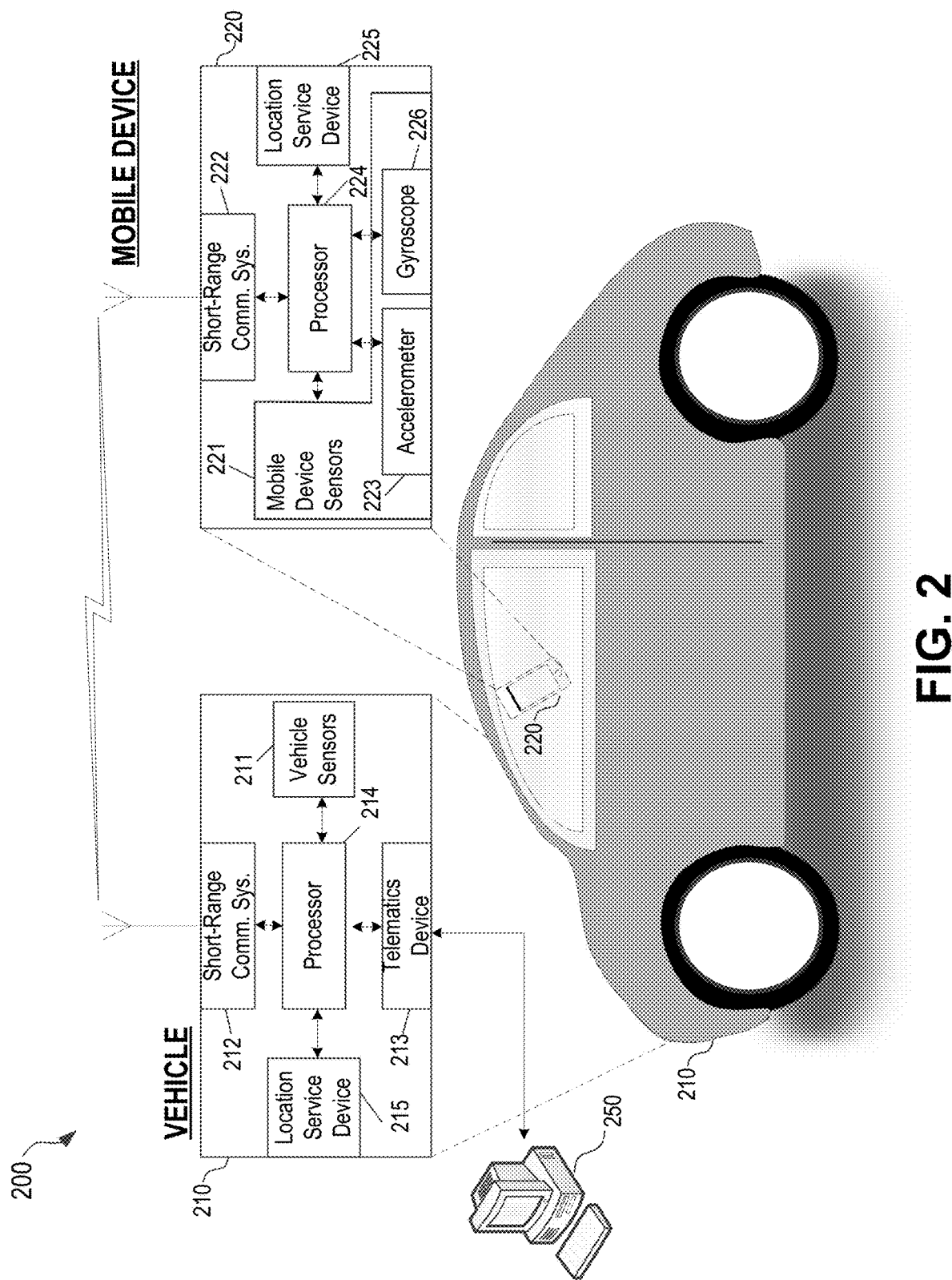
FIG. 2 is a diagram illustrating various components and devices of a device location and configuration system, according to one or more aspects of the disclosure.

FIG. 2 is a diagram of an illustrative device location and configuration system 200 including a vehicle 210 and a mobile device 220 and additional related components. Each component shown in FIG. 2 may be implemented in hardware, software, or a combination of the two. Additionally, each component of the device location and configuration system 200 may include a computing device (or system) having some or all of the structural components described above for mobile device locating computing device 101. The illustration of a single mobile device is exemplary and any number of mobile devices may be present in the device location and configuration system 200.

Vehicle 210 in the device location and configuration system 200 may be, for example, an automobile, motorcycle, scooter, bus, recreational vehicle, boat, or any other vehicle for which vehicle driving data may be analyzed. The vehicle 210 includes vehicle operation sensors 211 capable of detecting and recording various conditions at the vehicle and operational parameters of the vehicle. For example, sensors 211 may detect and store data corresponding to the vehicle's location (e.g., GPS coordinates), speed and direction, rates of acceleration or braking, and specific instances of sudden acceleration, braking, and swerving. Sensors 211 also may detect and store data received from the vehicle's 210 internal systems, such as door opening and closing, door locking and unlocking, cruise control usage, turn signal usage, seat belt usage, phone and radio usage within the vehicle, maintenance performed on the vehicle, and other data collected by the vehicle's computer systems.

Additional sensors 211 may detect and store external conditions during driving. For example, external cameras and proximity sensors 211 may detect other nearby vehicles, traffic levels, road conditions, traffic obstructions, animals, cyclists, pedestrians, and other conditions that may factor into a driving event data analysis. Additional sensors 211 may detect and store data relating to the maintenance of the vehicle 210, such as the engine status, oil level, engine coolant temperature, odometer reading, the level of fuel in the fuel tank, engine revolutions per minute (RPMs), and/or tire pressure.

Certain vehicle sensors 211 also may collect information regarding the driver's route choice, whether the driver follows a given route, and to classify the type of trip (e.g. commute, errand, new route, etc.). This may be in combination with a location service device 215 which is connected to a location service. The location service device 215 may be, for example, one or more devices receiving Global Positioning System (GPS) data or other locational sensors positioned inside the vehicle 210, and/or locational sensors or devices external to the vehicle 210 which may be used determine the route or position of the vehicle.

Mobile device 220 in the device location and configuration system 200 may be, for example, any mobile device, such as a smartphone, tablet computing device, personal digital assistant (PDA), smart watch, netbook, laptop computer, and other like devices. The mobile device 220 includes a set of mobile device sensors 221, which may include, for example, gyroscope 226 and accelerometer 223. The mobile device sensors 221 may be capable of detecting and recording various conditions at the mobile device 220 and operational parameters of the mobile device 220. For example, sensors 221 may detect and store data corresponding to the mobile device's location (e.g., GPS coordinates), speed and direction in one or multiple axes (forward and back, left and right, and up and down for example), rates of acceleration or deceleration, and specific instances of sudden acceleration, deceleration, and lateral movement. Sensors 221 may include audio sensors, video sensors, signal strength sensors, communication network-presence sensors, ambient light sensors, temperature/humidity sensors, barometer sensors, and may detect and store relevant data, such as data which may be indicative of entering or exiting a vehicle. This may include for example, listening for audio signals indicating a door locking/unlocking, door chime, or vehicle ignition, sensing light from an overhead or dashboard light, detecting a temperature or humidity change indicative of entering a vehicle, detecting a presence of a network or communication device associated with a vehicle (e.g., a BLUETOOTH transceiver associated with a vehicle), and other data collected by the mobile device's sensors.

Software applications executing on mobile device 220 may be configured to detect certain driving data independently using mobile device sensors 221 and/or may communicate with vehicle sensors 211 to receive additional driving data. For example, mobile device 220 may be equipped with movement sensors, such as an accelerometer 223, gyroscope 226, speedometer, and/or GPS receivers, and may determine vehicle location, speed, acceleration, direction and other basic driving data without needing to communicate with the vehicle sensors 211, or any vehicle system. In other examples, software on the mobile device 220 may be configured to receive some or all of the driving data collected by vehicle sensors 211.

Additional sensors 221 may detect and store external conditions which may indicate presence within a vehicle. For example, audio sensors and proximity sensors 211 may detect other nearby mobile devices, traffic levels, road conditions, traffic obstructions, animals, cyclists, pedestrians, and other conditions that may factor into a driving event data analysis.

Certain mobile device sensors 221 also may collect information regarding the driver's route choice, whether the driver follows a given route, and to classify the type of trip (e.g. commute, errand, new route, etc.). This may be in combination with a location service device 225 which is connected to a location service. The location service device 225 may be, for example, one or more devices receiving GPS data, or may be other device(s) or other locational sensors positioned at the mobile device 220.

Data collected by the mobile device sensors 221 may be stored and/or analyzed within the mobile device 220, and/or may be transmitted to one or more external devices. At the same time, data collected by the vehicle sensors 211 may be stored and/or analyzed within the vehicle 210, and/or may be transmitted to one or more external devices. For example, as shown in FIG. 2, sensor data may be exchanged (uni-directionally or bi-directionally) between vehicle 210 and mobile device 220 via short-range communication systems 212 and 222. Additionally, the sensor data may be transmitted from the vehicle 210 and/or mobile device 220 to one or more remote computing devices, such as location determination and configuration server 250, via a telematics device 213, and/or via a communication interface and communication system (not shown).

Short-range communication systems 212 and 222 are data transmission systems configured to transmit vehicle operational data to other nearby vehicles, and to receive vehicle operational data from other nearby vehicles. Short-range communication systems 212 and 222 may be implemented using short-range wireless protocols such as WLAN communication protocols (e.g., IEEE 802.11), Bluetooth (e.g., IEEE 802.15.1), or one or more of the Communication Access for Land Mobiles (CALM) wireless communication protocols and air interfaces. The transmissions between the short-range communication systems 212 and 222 may be sent via Bluetooth, satellite, GSM infrared, IEEE 802.11, WiMAX, RFID, and/or any suitable wireless communication media, standards, and protocols. In certain systems, short-range communication systems 212 and 222 may include specialized hardware installed in vehicle 210 and mobile device 220 (e.g., transceivers, antennas, etc.), while in other examples the communication systems 212 and 222 may be implemented using existing hardware components (e.g., radio and satellite equipment, navigation computers) or may be implemented by software running on the mobile device 220 and within the vehicle 210.

In certain examples, mobile device 220 may periodically broadcast sets of accelerometer or other sensor data, such as data from an onboard gyroscope or GPS receiver or the like. Alternatively, in some examples, the vehicle 210 may periodically broadcast sets of vehicle data to be received by the mobile device 220 (this may be, for example, where the mobile device is tasked with determining its location within the vehicle). The state or usage of the vehicle's 210 controls and instruments may also be transmitted to the mobile device, for example, as well as whether the vehicle is accelerating, braking, turning, and by how much, and/or which of the vehicle's instruments are currently activated by the driver (e.g., turn signals, cruise control, lane assist, and so on). In various other examples, any data collected by any vehicle sensors 211 potentially may be transmitted. Further, additional vehicle driving data not from the vehicle's sensors (e.g., vehicle make/model/year information, driver insurance information, driving route information, vehicle maintenance information, driver scores, and so on) may be collected from other data sources, such as a driver's or passenger's mobile device 220.

As shown in FIG. 2, the data collected by vehicle sensors 211 and/or the data collected by mobile device sensors 221 also may be transmitted to an external source, such as a location determination and configuration server 250, and one or more additional external servers and devices via a telematics device 213 and/or other communication devices/interfaces. The communications devices such as telematics device 213 may be computing devices containing many or all of the hardware/software components as the mobile device locating computing device 101 depicted in FIG. 1. As discussed above, the telematics device 213 may receive vehicle operation data and driving data from vehicle sensors 211, and may transmit the data to one or more external computer systems (e.g., a location determination and configuration server 250 of an insurance company, financial institution, or other entity) over a wireless transmission network. The telematics device 213 also may be configured to detect or determine additional types of data relating to real-time driving and the condition of the vehicle 210. In certain embodiments, the telematics device 213 may contain or may be integral with one or more of the vehicle sensors 211. The telematics device 213 also may store the type of its respective vehicle 210, for example, the make, model, trim (or sub-model), year, and/or engine specifications, as well as other information such as vehicle owner or driver information, insurance information, and financing information for the vehicle 210.

In the example shown in FIG. 2, telematics device 213 may receive vehicle driving data from vehicle sensors 211, and may transmit the data to a location determination and configuration server 250. However, in other examples, one or more of the vehicle sensors 211 may be configured to transmit data directly to a location determination and configuration server 250 without using a telematics device. In other examples, telematics device 213 may be configured to transmit vehicle driving data to the mobile devices 220 (e.g., in addition to or in the alternative to short-range communication system 212/222). Telematics device 213 may be configured to receive and transmit data from certain vehicle sensors 211, while other sensors may be configured to directly transmit data to a location determination and configuration server 250 without using the telematics device 213. In other examples, one or more of the vehicle sensors 211 may be configured to transmit data to the mobile device 220 without using a telematics device. For instance, telematics device 213 may be configured to receive and transmit data from certain vehicle sensors 211, while other sensors may be configured to directly transmit data to the mobile devices 220 within the vehicle 210 without using the telematics device 213. Mobile device 220 may be configured to transmit sensor data, including sensor data received via short-range communication system 222 and/or telematics device 213 to a location determination and configuration server 250. Thus, telematics device 213 may be optional in certain embodiments.

In certain embodiments, mobile device 220 may be used to collect vehicle driving data and/or mobile device data from sensors 211 and 221, and then used to transmit the vehicle driving data to the location determination and configuration server 250 and other external computing devices directly or via telematics device 213. As used herein, mobile computing devices 220 "within" the vehicle 210 include mobile devices 220 that are inside of or otherwise secured to a moving vehicle, for instance, in the cabins of automobiles, buses, recreational vehicles, motorcycles, scooters, or boats, and mobile devices 220 in the possession of drivers or passengers of vehicle.

Vehicles 210 and mobile devices 220 may include device location determination and configuration modules as hardware, software and/or firmware components with processors 214 and 224, respectively. Alternatively, device location determination and configuration modules may be separate computing devices or may be integrated into one or more other components within the vehicle 210 and mobile device 220, such as the short-range communication systems 212 and 222, telematics device 213, or other internal computing systems of vehicles 210 and 220. The location determination and configuration modules may contain some or all of the hardware/software components as the mobile device locating computing device 101 depicted in FIG. 1. Further, in certain implementations, the functionality of the location determination and configuration modules, such as storing and analyzing vehicle driving data, storing and analyzing mobile device based data, determining a predicted location of a mobile device, and performing one or more follow-on actions, may be performed in a location determination and configuration server 250 rather than by individual vehicle 210 and mobile device 220. In such implementations, the vehicle 210 and mobile device 220 might only collect and transmit data to location determination and configuration server 250, and thus the device location determination and configuration modules within processors 214 and 224 may be optional.

Device location determination and configuration modules within processors 214 and 224 may be implemented in hardware and/or software configured to receive vehicle driving data from vehicle sensors 211, mobile device sensors 221, short-range communication systems 212 and 222, telematics device 213, and/or other data sources. After receiving the data, device location determination and configuration modules within processors 214 and 224 may perform a set of functions to analyze the data, determine a position of the mobile device within the vehicle, and perform one or more actions based on the determination of the position. For example, the device location determination and configuration modules within processors 214 and 224 may include one or more positioning algorithms, machine learning algorithms, and device detection algorithms, which may be executed by software running on generic or specialized hardware within the device location determination and configuration modules. The device location determination and configuration module within processors 214 in a vehicle 210 may use the vehicle driving data received from that vehicle's sensors 211, along with data from mobile device 220 received via the short-range communication system 212, to determine a particular location of the mobile device 220 within the interior of the vehicle 210. Further descriptions and examples of the algorithms, functions, and analyses that may be executed by the device location determination and configuration modules within processors 214 and 224 are described below in reference to FIGS. 3-8.

The system 200 also may include a device location determination and configuration server 250, containing some or all of the hardware/software components as the mobile device locating computing device 101 depicted in FIG. 1. The device location determination and configuration server 250 may include hardware, software, and network components to receive vehicle driving data from vehicle 210 and mobile devices 220, and other data sources. The device location determination and configuration server 250 may include databases and device location determination and configuration modules (not shown) to respectively store and analyze driving data received from vehicles and other data sources. The device location determination and configuration server 250 may initiate communication with and/or retrieve driving data from vehicle 210 wirelessly via telematics device 213, mobile device 220, or by way of separate computing systems over one or more computer networks (e.g., the Internet). Additionally, the device location determination and configuration server 250 may receive additional data relevant to mobile device positioning information determinations from other non-vehicle data sources, such as external traffic databases containing traffic data (e.g., amounts of traffic, average driving speed, traffic speed distribution, and numbers and types of accidents, etc.) at various times and locations, external infrastructure elements (e.g., network elements of a data or telecommunications network such as a cellular telephone or data network), and the like.

The device location determination and configuration modules within the device location determination and configuration server 250 may be configured to retrieve data from the local database, or may receive driving data directly from vehicle 210, mobile device 220, or other data sources, and may perform functions such as determining a location of the mobile device 220 within the interior of vehicle 210, transmitting notifications to the vehicle 210, mobile device 220, or other devices when the location of the mobile device is determined, or when it is determined to be within a specific area of the interior (e.g., driver's seat, passenger's seat, trunk, glove compartment, mounting device, and so on) collecting data related to dangerous driving behaviors (e.g., using the mobile device while operating the vehicle), performing post-collection processing, and other related functions. The functions performed by the device location determination and configuration modules may be similar to those of device location determination and configuration modules within processors 214 and 224, and further descriptions and examples of the algorithms, functions, and analyses that may be executed by the device location determination and configuration modules are described below in reference to FIGS. 3-8.

In various examples, the analyses and actions performed within device location determination and configuration modules may be performed entirely in device location determination and configuration module of the device location determination and configuration server 250 (in which case device location determination and configuration modules within processors 214 and 224 need not be implemented in vehicle 210 and mobile device 220), may be performed entirely in the vehicle-based and mobile device-based modules within processors 214 and 224 (in which case the device location determination and configuration module and/or the server 250 need not be implemented), or in some combination of the two. For example, a vehicle-based module within processor 214 and device-based module within processor 224 may continuously receive and analyze data and determine a change in position within the interior of the vehicle 210 has not occurred, so that large or repetitive amounts of data need not be transmitted to the server 250. However, after an excessive change in position is detected (e.g., because one passenger in the car has handed the phone to another passenger or the driver) the data may be transmitted to the server 250, and the modules thereof may determine if the execution of one or more actions is required.

FIG. 3A and FIG. 3B illustrate exemplary events for which data may be collected by the vehicle sensors 211 and/or the device sensors 221. In FIG. 3A, a road-surface discontinuity (here, a bump 404) may be encountered by the front tire 405 of a vehicle 403 (which may be vehicle 210 from FIG. 2). The bump 404 exerts a force on the vehicle at the axle, causing an acceleration and a positive vertical displacement of the front tire 405. For example, bump 404 may be a speed bump and the traversal of the speed bump may cause the front of car 403 to rise as front tire 405 passes over the speed bump. As this bump is encountered on the front tire, the translation of the force of the bump through the vehicle's center of gravity 407 causes a rotation of the vehicle about the rear axle toward the rear of the vehicle (e.g., illustrated via arrow 406). Typically, this is not perceived by the vehicle occupants for any great length of time, as once the vehicle returns to the "flat" surface after traversing the bump, the vehicle experiences a corresponding rotation about the rear axle in the opposite direction. A bump 404 which causes negative vertical displacement of the front tire 405 (e.g., a pothole) will result in the opposite initial rotation than that depicted in FIG. 3A (e.g., the car will rotate about the rear axle toward the front of the vehicle).

In FIG. 3B, a bump 414 may be encountered by the rear tire 415 of the vehicle 403. The bump 414 exerts a force on the vehicle at the axle, causing an acceleration positive vertical displacement of the rear tire 415. For example, bump 414 may be a speed bump and the traversal of the speed bump may cause the rear of car 403 to rise as rear tire 415 passes over the speed bump. As this bump is encountered on the rear tire, the translation of the force of the bump through the vehicle's center of gravity 407 causes a rotation of the vehicle about the front axle toward the front of the vehicle (e.g., illustrated via arrow 416). Once again, the vehicle quickly returns to the "flat" surface after traversing the bump, and the vehicle experiences a corresponding rotation about the front axle in the opposite direction. A bump 414 which causes negative vertical displacement of the rear tire 415 will result in the opposite initial rotation than that depicted in FIG. 3B (e.g., the car will rotate about the front axle toward the rear of the vehicle).

Figure 4:
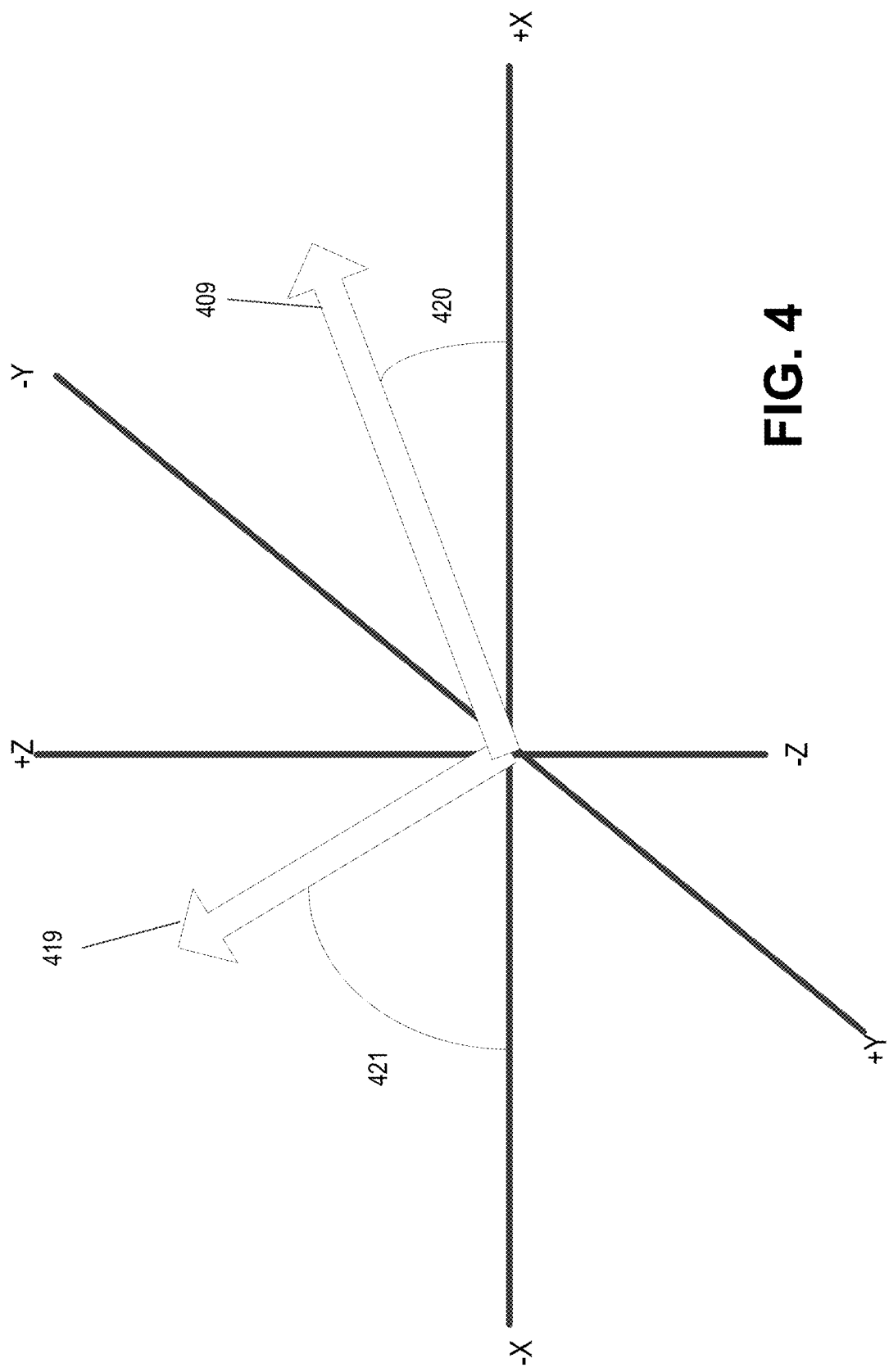
FIG. 4 illustrates various aspects of force vectors encountered by vehicles and devices therein as they encounter bumps, which may be analyzed according to one or more aspects of the present disclosure.
Figure 6A:
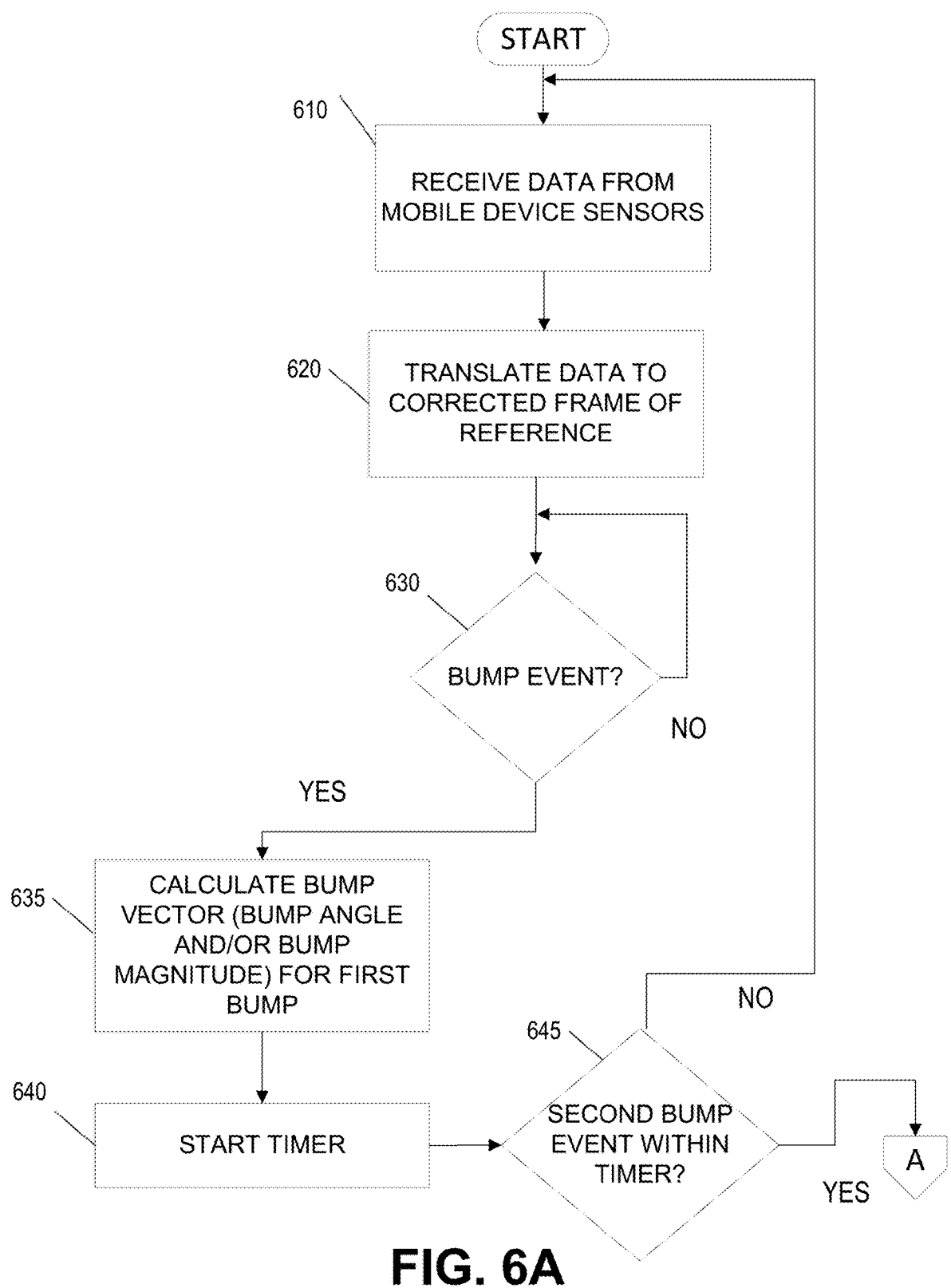
FIGS. 6A and 6B together illustrate one example method of estimating a position of a mobile device within an interior of a vehicle, according to one or more aspects of the present disclosure.
Figure 6B:
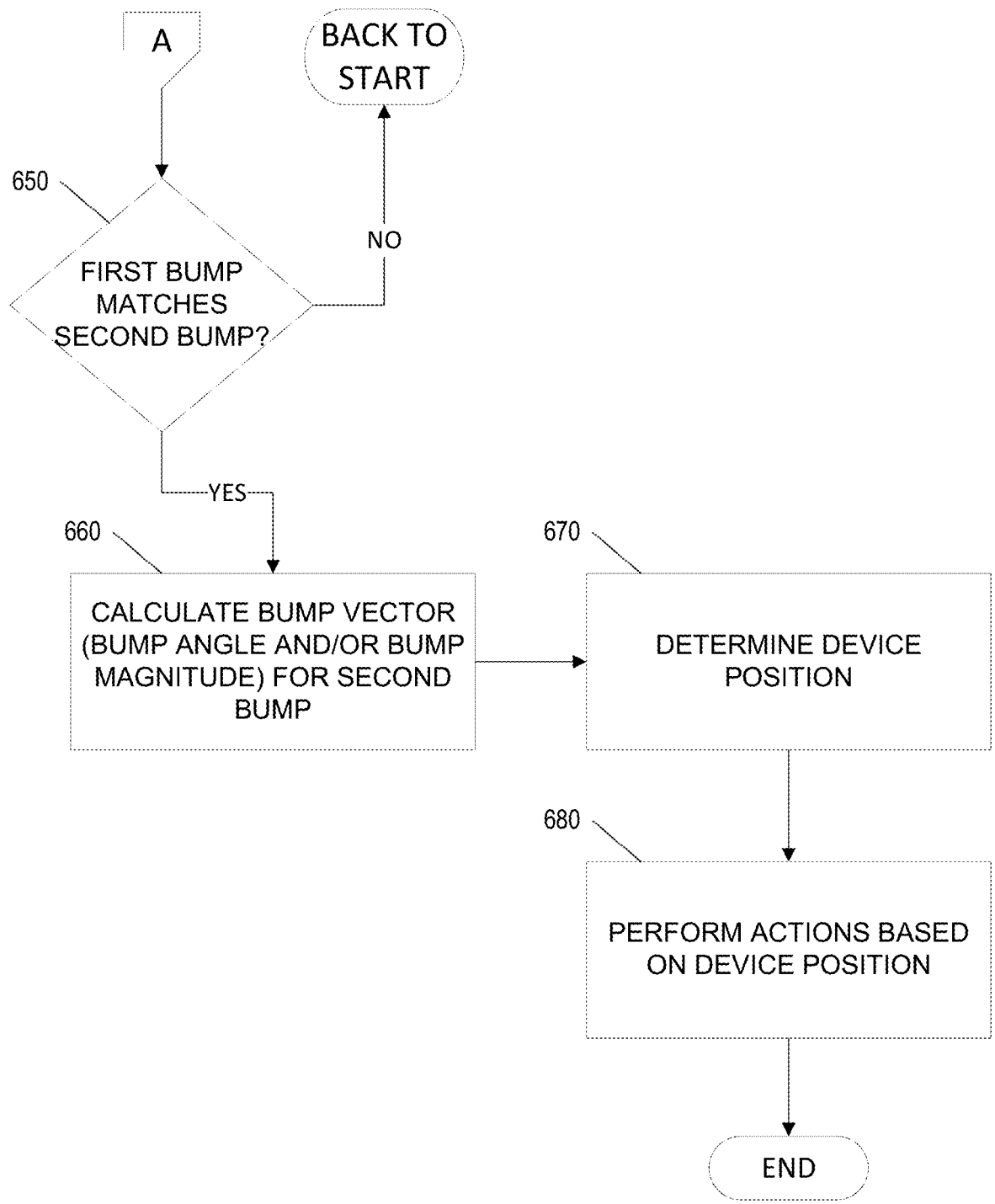

As seen in FIG. 4, which illustrates a plot of accelerations 409 and 419 in the frame of reference discussed above, two angles 420 and 421 may be determined, with angle 421 having a larger absolute magnitude than angle 420 when measured from the X-axis. In some aspects, acceleration data may represent a movement vector in all three dimensions (e.g., rightward, forward, and upward, for example from a bump experienced during a turn) and angles 420 and 421, or any other angle derived from the movement of mobile device 408 and/or vehicle 403 may be represented in one or multiple dimensions.

FIG. 5A and FIG. 5B illustrate further exemplary events for which data may be collected by the vehicle sensors 211 and/or the device sensors 221. Here, one difference between the events depicted in FIGS. 5A and 5B and the events previously discussed above, is that the bump may be experienced by either the left (−y) or right (+y) side of the vehicle. In FIG. 5A, a bump 504 may be encountered by the front left tire 505 (when facing the front of the vehicle) of a vehicle 503. The bump 504 causes positive vertical displacement of the front left tire 505. For example, bump 504 may be a speed bump and the traversal of the speed bump may cause the front left of car 503 to rise as front left tire 505 passes over the speed bump. As this bump is encountered on the front left tire, the translation of the force of the bump through the vehicle's center of gravity 507 causes a rotation of the vehicle about an axis through a point located near the right rear tire, with the rotation toward the rear of the vehicle (e.g., illustrated via arrow 508 which illustrates direction of rotation but not necessarily position of the axis). A bump 504 which causes negative vertical displacement of the front left tire 505 (e.g., a pothole) will result in the opposite initial rotation than that depicted in FIG. 5A (e.g., the car will rotate about the point toward the front of the vehicle).

In FIG. 5B, a bump 514 may be encountered by the front right tire 515 of the vehicle 503. The bump 514 causes positive vertical displacement of the front right tire 515. For example, bump 514 may be a speed bump and the traversal of the speed bump may cause the front right of car 503 to rise as right front tire 515 passes over the speed bump. As this bump is encountered on the rear tire, and because the vehicle is traveling with speed, the translation of the force of the bump through the vehicle's center of gravity 507 causes a rotation of the vehicle about axis through a point near the rear left tire. A bump 514 which causes negative vertical displacement of the front right tire 515 will result in the opposite rotation than that depicted in FIG. 5B (e.g., the car will rotate about the axis toward the front right of the vehicle).

As may be seen with reference to FIGS. 3A, 3B, 4, 5A, and 5B, a vehicle which encounters a bump may experience a corresponding vertical movement (e.g., movement along the positive or negative Z-axis) as well as movement alone one or more of the other axis (e.g., movement along the positive or negative X-axis and/or Y-axis). This single-axis or multi-axis movement may be experienced by a mobile device located within the vehicle. With particular reference to FIGS. 3A and 3B, a vector of acceleration of the vehicle caused by the bump may form an angle with the axes of movement (e.g., a vehicle "bump angle") which are depicted in FIG. 4 as angles 420 and 421. This vector and this bump angle may be derived from data sensed by the vehicle sensors 211. A similar vector of acceleration of the mobile device caused by the bump and its corresponding bump angle may also be derived from data sensed by the mobile device sensors 211, such as accelerometer 223. Although the term "bump angle" is used herein, such terminology is not limited to events where the encountered road-surface discontinuity results in movement/acceleration along the positive Z-axis and may include any road-surface discontinuity that results in movement and/or acceleration along any one or more axis.

FIG. 5C illustrates various aspects of graphed data resulting from vehicular encounters with a bump, which reflects how the magnitude of acceleration and movement in a single axis may be experienced by a mobile device. For example, line 550 demonstrates a smaller first bump magnitude (e.g., from a first tire hitting the bump) than the second bump magnitude (e.g., from a second tire hitting the bump). Accordingly, as will be explained further below, the sequence and magnitude of bumps in line 550 may indicate that the device is located closer to the position of the location where the second bump was caused (e.g., the second tire) than the first bump location. Furthermore, the time difference between the bumps may indicate that the device is closer to or further away from the center of gravity of the vehicle. Line 560, however, indicates a stronger first bump magnitude, indicating that the device may be closer to the first bump event location than the second bump event location.

With the terminology and environments of FIGS. 3-5 in mind, FIG. 6 depicts an illustrative method for determining the position of a mobile device in a vehicle according to one or more aspects herein. In step 610, data is received at a sensor of a mobile device. This may be, for example, accelerometer data from accelerometer 223. In step 610, the data may be received at a processing device. For ease of discussion, the term processing device includes at least the various devices and systems discussed above which may be utilized to determine the mobile device position within the vehicle interior (e.g., the processing device may be one or more of the mobile device 220, the vehicle 210, the various modules of the processors 214 and 224, the server 250, and the like).

In step 620, the data received by the processing device may be translated to a corrected frame of reference. In many aspects, determining the axes of movement may be part of the problem of determining the position of the mobile device, For example, mobile devices may be in a garment pocket, in a bag or purse, in a glove compartment or center console, or angled near DC power ports for charging purposes. Accordingly, what may appear as lateral movement (e.g., Y-axis movement) to the accelerometer of the mobile device may actually be forward and backward movement (e.g., X-axis movement) in the vehicle's reference frame because the mobile device may be at be angled or rotated. At step 620, one or more inferences may be derived from the incoming data to determine which axis of incoming data corresponds to a frontwards/backwards axis (X-axis), a lateral axis (Y-axis), and vertical axis (Z-axis). These one or more inferences may be derived based on the receiving and processing of data from other sources, as discussed above. Data may be received from other sensors of the vehicle and/or the mobile device to infer the X axis and Y axis. For example, acceleration and/or deceleration data may be obtained from the vehicle (e.g., operation of the gas or brake pedals, data from a fixed accelerator, and so on), and an appropriate change in magnitude alone one or more axis may be determined. As another example, data from the vehicle might not be used, and only data available to the mobile device may be used instead. For example, data may be received from the accelerometer data and may be examined to determine movement at a right angle to a gravity-vector (e.g., a vector indicating acceleration due to gravity). This may assist the device in determining an orientation of the mobile device. The mobile device may detect a large magnitude of movement along one or more axis and may compare the timing of that magnitude of movement with data from location services device 225 indicating a change in velocity or speed based on received GPS data. From this, the mobile device may be able to infer which axis or axes contain movement in the X-direction.

Separately at step 620, or in combination with the above, the processing device may be able to infer left and right (e.g., Y-axis movement). For example, the processing device may receive a signal indicative that the vehicle is making a left or right turn (e.g., data indicating the operator has engaged the left or right turn signal, data indicating the steering wheel has been rotated to the left or the right, GPS or location services data indicating that the route has been updated because the operator has made a left or right turn, or the like). Again, in some aspects this data might not be obtained from the vehicle and may instead be obtained only via the sensors local to the mobile device. For example, GPS or location services data may be received from location services device 225 indicating a left or right turn has been made, and the accelerometer data may be examined to determine movement at a right angle to a gravity-vector (e.g., a vector indicating acceleration due to gravity). Corrected data may result from the processing and translation of the incoming data to determine one or more inferences related from the data.

In step 630, the corrected data may be examined to determine a bump event. This may include, for example, determining positive or negative movement and/or acceleration in the corrected Z-axis indicating the presence of a road-surface discontinuity (e.g., a bump, pothole, or the like). For example, the magnitude of movement and/or acceleration along the Z-axis may be compared to a predetermined threshold; if the magnitude of the vector exceeds the predetermined threshold (YES branch from step 630), then the data may reflect a candidate event. A predetermined threshold may be used, for example, to avoid the capturing of excessive data, and/or to avoid triggering the detection method for a false positive event (e.g., noise occurring in the data from uneven pavement or an operator repositioning themselves in their seat). If the magnitude of the vector does not exceed the predetermined threshold, then the method may await additional data (NO branch from step 630).

At step 635, a bump angle and bump magnitude may be calculated. In some aspects, the bump angle may be calculated by performing a dot product of the corrected data in two or more axes. For example, one calculation of the bump angle may include taking an acceleration vector and dot product multiplying with the down vector (Z-axis), a corresponding calculation of the arctangent of the ratio of the X-axis vector and the Z-axis vector (e.g., arctan(X/Z)) may result in the bump angle. The result of the calculation, regardless of how it may be performed, may be stored in a storage device for retrieval and/or further calculation later in the process.

In some aspects, receiving further data may be beneficial for providing increased certainty in the device locating. This further data may include, for example, additional data from the accelerometer of the mobile device, since in some examples, a bump should be encountered by both the front and the rear tires of the vehicle. The expectation in these examples may be that the event determined to exceed the threshold at step 630 may be the front tire or front tires encountering the bump. One way to receive the further data may be, at step 640, to instantiate a timer or timing logic to await additional data indicative of movement or acceleration. The duration of the timer may be, for example, based on the speed of the vehicle (either provided from a vehicle-based data source or a mobile-device data source). If data indicative of a bump (a second bump) is received within the duration (YES branch from step 645), the data of the original (first) bump and the data of the second bump may be matched and compared at step 650. If the data of the second bump differs from the data from the first bump (e.g., based on one or more heuristic analyses, it is determined that it is unlikely the same road-surface discontinuity caused the first bump data and the second bump data), the first and second data may be discarded and the method may be restarted (NO branch from step 650). Additionally, if the second bump is not sensed, the method may be restarted (NO branch from step 645).

If, however, the first bump matches the second bump (YES branch from step 650), a calculation similar to that discussed above may be performed at step 660: again, one calculation of the second bump magnitude may include taking a forward vector (X-axis) and dot product multiplying with the down vector (Z-axis), a corresponding calculation of the arctangent of the ratio of the X-axis vector and the Z-axis vector (e.g., arctan(X/Z)) may result in the second bump angle.

Based on the first bump vector or components thereof (e.g., first bump magnitude, first bump angle) and/or the second bump vector or components thereof (e.g., second bump magnitude, second bump angle), the device position may be estimated in step 670. This may include feeding the first bump vector or its components and/or the second bump vector or its components into a heuristics engine, which may be implemented by one or more of the processors and devices previously discussed (e.g., mobile device locating computing device 101 and so on). The heuristics engine may use various variables and assign various weights to the variables. For example, variables which may be examined by the heuristics engine may include: "first/second bump angle," "first/second bump magnitude," "listening for turn signal with microphone," "detecting mobile device being placed into cradle," "difference in bump magnitudes," "difference in bump angles," "duration between bumps," "rotation of device from a time estimated to be when the mobile device entered the vehicle," "acceleration signal from a time estimated to be when the mobile device entered the vehicle," "Fourier coefficients of accelerometer from a time estimated to be when the mobile device entered the vehicle," and "Fourier coefficients of gyroscope from a time estimated to be when the mobile device entered the vehicle." Naturally, other variables may be used without parting from the scope of the present disclosure; in particular, any variable or sensed data may be used by the heuristics engine to determine a location of a mobile device. The heuristics engine may be calibrated to determine a target variable of left or right position and/or front or back position. In some aspects, the heuristics engine may include usage of a support vector machine, neural network, random forest, gradient boosted tree, generalized linear model, or other statistical modeling techniques.

As an example of a simplistic determination which may be performed by the heuristics engine to determine a rough location of the mobile device within the interior of the vehicle, the difference in bump angle and the difference in the bump magnitude may indicate an approximate position of the mobile device relative to the center of gravity of the vehicle, as discussed above with reference to FIGS. 3-5, and especially FIG. 5C. For example, a "stronger" first bump in data 560 (e.g., data with greater bump magnitude or larger bump angle) may indicate the mobile device is located closer to the front of the vehicle, whereas a "stronger" second bump in data 550 may indicate the mobile device is located closer to the rear of the vehicle.

As another example of a determination which may be performed by the heuristics engine to determine a rough location of the mobile device, accelerometer and gyroscope data may be collected at the mobile device. The data may contain indicators of rhythmic movement along one or more axes, which may indicate that a user is carrying the device on their person while walking. Data signatures and/or pattern matching may be employed, which may include comparing the received data to known accelerometer and/or gyroscope signal values. For example, the indicators may be different if the device is held in the user's hand, in a bag, in a pocket near the user's hip, or in a shirt pocket, for example. By comparing the accelerometer and gyroscope data to the known values, it may be possible to determine whether subsequent received data indicates the user is entering a vehicle, because the received data further matches the patterns present in the known values. Given this matching of the data to a known pattern, it may be possible to determine if the mobile device is entering the vehicle on the driver's side or passenger's side, especially if further data indicates the mobile device is within a driver's quadrant or non-driver's quadrant.

Returning to FIG. 6A, in some aspects, the received data may indicate a strong lateral or left/right (Y-axis) movement. Accordingly, in some aspects in step 635 and 660 a third and fourth bump vector using the Y-axis component may be calculated. For example, this calculation of the third and fourth bump vector may include calculating a bump magnitude by taking a left/right vector and dot product multiplying with the down vector (Z-axis), and performing a corresponding calculation of the arctangent of the ratio of the Y-axis vector and the Z-axis vector (e.g., arctan(Y/Z)) may result in the third and fourth bump angle. These additional bump vectors or their components may be used by the heuristics engine to determine the position. For example, a first bump may have a strong +Y component, and the second bump may have no Y component or a strong −Y component, which may indicate that the mobile device may be located on the right side of the vehicle or its center of gravity.

Based on the determination of the position of the mobile device, one or more actions may be performed in step 680. These actions may include actions which configure the mobile device and/or the vehicle, such as providing a notification to the mobile device (e.g., displaying a warning on a display of the mobile device), deactivating a feature of the mobile device (e.g., disabling a text messaging application), providing a notification to the vehicle (e.g., displaying or enabling a visual or audio notification indicating that the mobile device has been detected in the area of the driver's seat and will be silenced while the vehicle is in motion), causing the activation or deactivation of a feature of the vehicle (e.g., enabling a BLUETOOTH transceiver, turning on lane assist functionality if disabled), transmitting a notification to a third party (e.g., transmitting a notification to an insurance service or insurance application indicating that a mobile device may be being used by a vehicle operator) and so on. Alternatively, other actions may be taken when the device is not located in the driver's area: for example, the activation or reactivation of features or the transmitting of a notification to a third party (e.g., transmitting a notification to an insurance service indicating that the vehicle operator is not using the mobile device).

The actions taken may be dependent on the variables inputted in the heuristics engine and/or other data. For example, if the duration between bumps is at or near the maximum duration, the first bump magnitude is within a certain range, and/or the mobile device indicates that has been placed in a cradle, certain functionality may be disabled on the mobile device (e.g., text messaging applications, social media applications) but other functionality may be enabled (e.g., route guidance or navigation applications) as the ranged bump magnitude and/or cradle detection may indicate the mobile device is being held statically and not in the driver's hand.

Figure 7A:
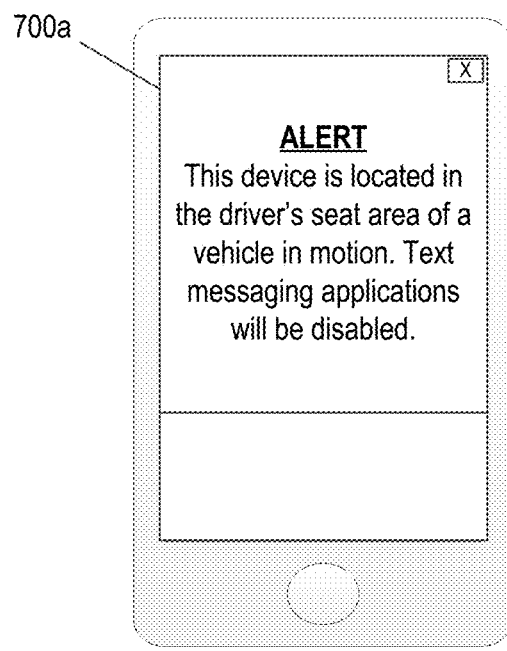
FIGS. 7A and 7B illustrate user interfaces according to one or more aspects of the present disclosure.
Figure 7B:
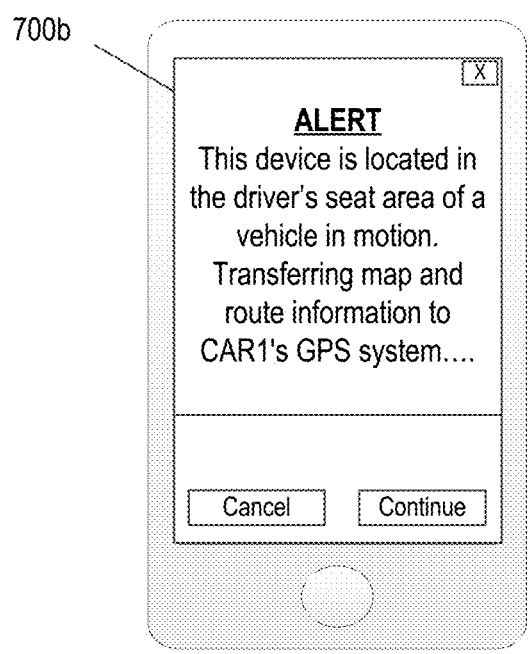

FIGS. 7A and 7B illustrate various user interfaces indicating the execution of actions that may result from determining the position information. In user interface 700a, an interface is displayed indicating that the mobile device is in the driver's seat and the vehicle is in motion, and as a result the text messaging applications may be disabled. In user interface 700b, an interface is displayed indicated that the mobile device is transferring map and routing information to a detected GPS system installed on the vehicle, rendering further usage of the mobile device unnecessary.

Figure 8A:
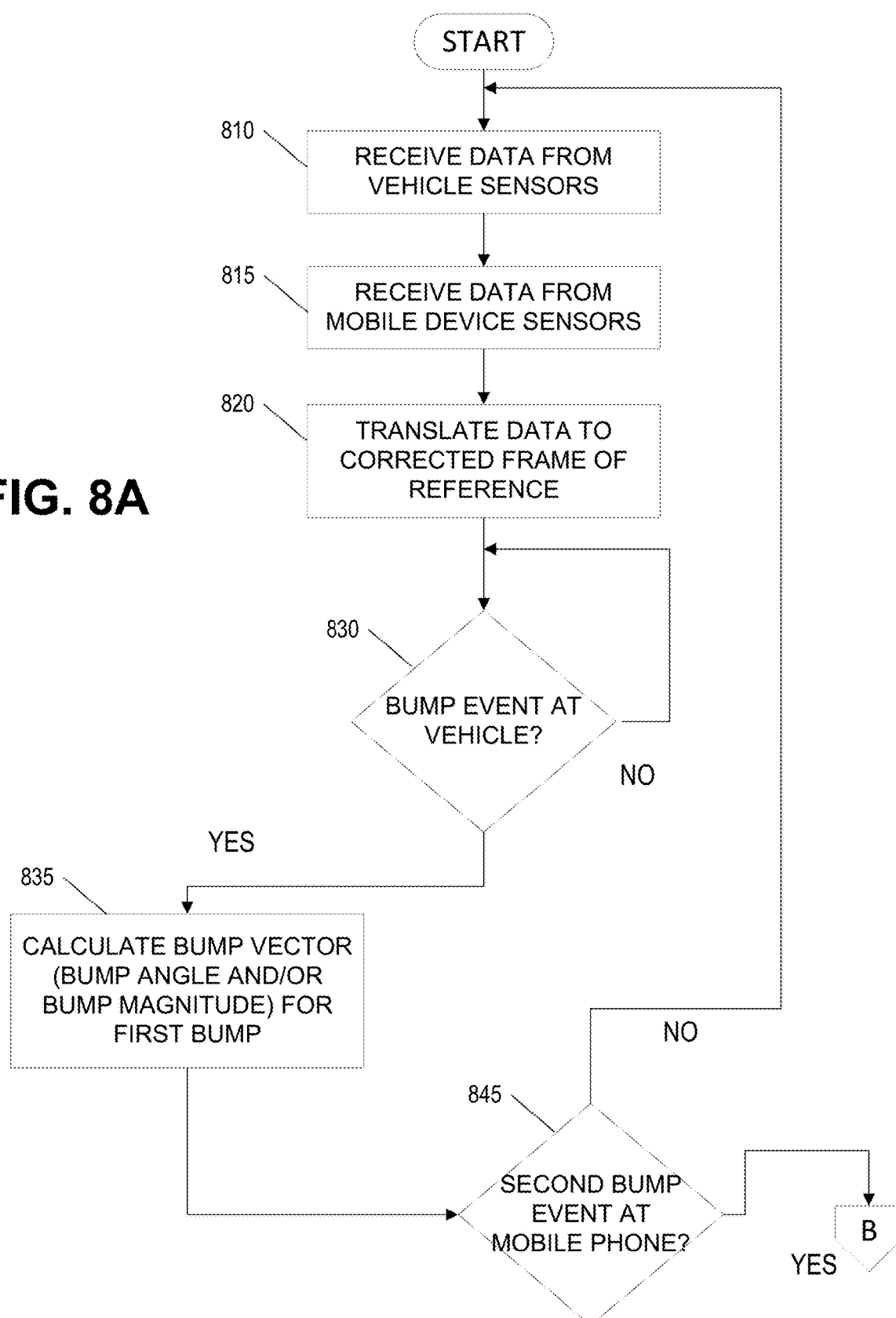
FIGS. 8A and 8B together illustrate another example method of estimating a position of a mobile device within an interior of a vehicle, according to one or more aspects of the present disclosure.
Figure 8B:
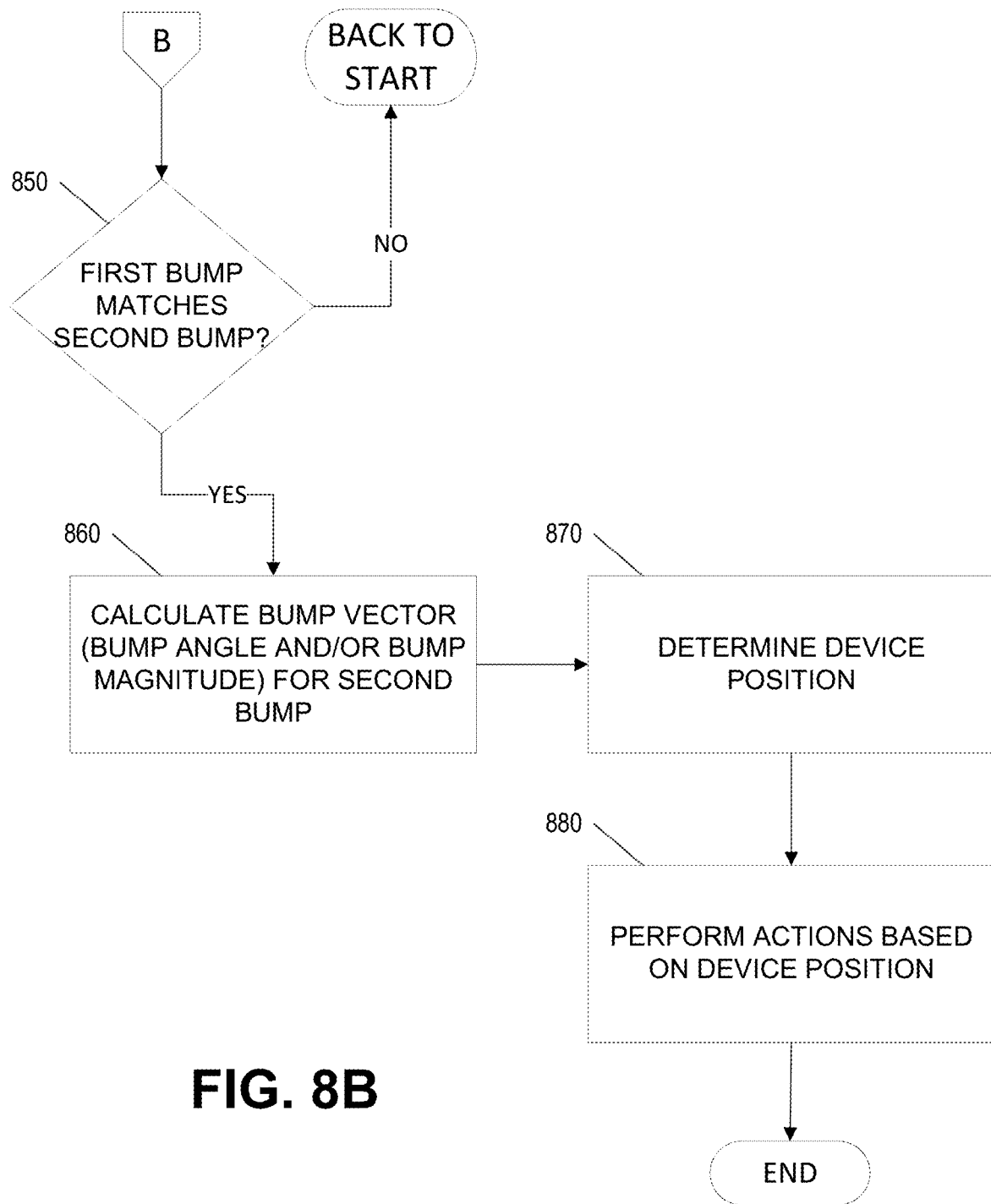

FIG. 8 provides an additional exemplary method to determine the location of a mobile device in the interior of a vehicle. The method of FIG. 8 differs from FIG. 6 in that vehicular accelerometer data is used in the method of FIG. 8. At step 810, information may be received from an in-motion vehicle (e.g., one or more sensors within the vehicle) at a processing device. This information may include information about the vehicle and its occupants: for example, the vehicle detected only a single door (the driver's door) opened and closed, and only the driver's seatbelt is engaged. In step 815, data may be received at a processing device from a sensor of a mobile device. This may be, for example, accelerometer data from accelerometer 223. Again, for ease of discussion, the term processing device includes at least the various devices and systems discussed above which may be utilized to determine the mobile device position within the vehicle interior (e.g., the processing device may be one or more of the mobile device 220, the vehicle 210, the various modules of the processors 214 and 224, the server 250, and the like).

In step 820, the data received by the processing device may be translated to a corrected frame of reference. In many aspects, determining the axes of movement may be part of the problem of determining the position of the mobile device, For example, mobile devices may be in a garment pocket, in a bag or purse, in a glove compartment or center console, or angled near DC power ports for charging purposes. Accordingly, what may appear as lateral movement (e.g., Y-axis movement) to the accelerometer of the mobile device may actually forward and backward movement (e.g., X-axis movement) in the vehicle's reference frame because the mobile device may be at be angled or rotated. At step 820, one or more inferences may be derived from the incoming data to determine which axis of incoming data corresponds to a frontwards/backwards axis (X-axis), a lateral axis (Y-axis), and vertical axis (Z-axis). These one or more inferences may be derived based on the receiving and processing of data from other sources, as discussed above. For example, data may be received from other sensors of the vehicle and/or the mobile device to infer the X axis and Y axis. For example, acceleration and/or deceleration data may be obtained from the vehicle (e.g., operation of the gas or brake pedals, data from a fixed accelerator, and so on), and an appropriate change in magnitude alone one or more axes may be determined.

Separately at step 820, or in combination with the above, the processing device may be able to infer left and right (e.g., Y-axis movement). For example, the processing device may receive a signal indicative that the vehicle is making a left or right turn (e.g., data indicating the operator has engaged the left or right turn signal, data indicating the steering wheel has been rotated to the left or the right, GPS or location services data indicating that the route has been updated because the operator has made a left or right turn, or the like). Corrected data may result from the processing and translation of the incoming data to determine one or more inferences related from the data.

In step 830, the corrected data may be examined to determine a bump event in the vehicle-based data (e.g., data from an accelerometer fixed in the interior of the vehicle, in the engine compartment of the vehicle and/or in the wheel area of the vehicle). This may include, for example, determining positive or negative movement and/or acceleration in the corrected Z-axis indicating the presence of a road-surface discontinuity (e.g., a bump, pothole, or the like). For example, the magnitude of movement and/or acceleration along the Z-axis may be compared to a predetermined threshold; if the magnitude of the vector exceeds the predetermined threshold (YES branch from step 830), then the data may reflect a candidate event. A predetermined threshold may be used, for example, to avoid the capturing of excessive data, and/or to avoid triggering the detection method for a false positive event (e.g., noise occurring in the data from uneven pavement). If the magnitude of the vector does not exceed the predetermined threshold, then the method may await additional data (NO branch from step 830).

At step 835, a bump angle and bump magnitude may be calculated. In some aspects, the bump angle may be calculated by performing a dot product of the corrected data in two or more axes. For example, one calculation of the bump magnitude may include taking a forward vector (X-axis) and dot product multiplying with the down vector (Z-axis), a corresponding calculation of the arctangent of the ratio of the X-axis vector and the Z-axis vector (e.g., arctan(X/Z)) may result in the bump angle. The result of the calculation, regardless of how it may be performed, may be stored in a storage device for retrieval and/or further calculation later in the process.

In some aspects, receiving further data may occur at step 845. This further data may include, for example, data from the accelerometer of the mobile device. Unlike in FIG. 6, however, a timer might not be needed, because the mobile device may sense the bump at approximately the same time as the sensors of the vehicle. As such, provided the second bump event is actually detected at the mobile device (e.g., YES branch from step 845), the data of the original (first) bump and the data of the second bump may be matched and compared at step 850. If the data of the second bump differs from the data from the first bump (e.g., based on one or more heuristic analyses, it is determined that it is unlikely the same road-surface discontinuity caused the vehicle bump data and the mobile device bump data), the first and second data may be discarded and the method may be restarted (NO branch from step 850). Additionally, if the second bump is not sensed, the method may be restarted (NO branch from step 845).

If, however, the first bump matches the second bump (YES branch from step 850), a calculation similar to that discussed above may be performed at step 860: again, one calculation of the second bump magnitude may include taking an acceleration vector and dot product multiplying with the down vector (Z-axis), a corresponding calculation of the arctangent of the ratio of the X-axis vector and the Z-axis vector (e.g., arctan(X/Z)) may result in the second bump angle.

Based on the first bump vector or components thereof (e.g., first bump magnitude, first bump angle) and/or the second bump vector or components thereof (e.g., second bump magnitude, second bump angle), the device position may be estimated in step 870. This may include feeding the first bump vector or its components and/or the second bump vector or its components into a heuristics engine, which uses various variables and assigns various weights to the variables. For example, variables which may be examined by the heuristics engine are discussed above, but may include: "first/second bump angle," "first/second bump magnitude," "listening for turn signal with microphone," "detecting mobile device being placed into cradle," "difference in bump magnitudes," "difference in bump angles," "duration between bumps," "rotation of device from a time estimated to be when the mobile device entered the vehicle," "acceleration signal from a time estimated to be when the mobile device entered the vehicle," "Fourier coefficients of accelerometer from a time estimated to be when the mobile device entered the vehicle," and "Fourier coefficients of gyroscope from a time estimated to be when the mobile device entered the vehicle."

As an example of a simplistic determination which may be performed by the heuristics engine to determine a rough location of the mobile device within the interior of the vehicle, the difference in bump angle and the difference in the bump magnitude may indicate an approximate position of the mobile device relative to the center of gravity of the vehicle, as discussed above with reference to FIGS. 3-5.

In some aspects, the received data may indicate a strong lateral or left/right (Y-axis) movement. Accordingly, in some aspects in step 835 and 860 a third and fourth bump vector using the Y-axis component may be calculated. For example, this calculation of the third and fourth bump vector may include calculating a bump magnitude by taking a left/right vector and dot product multiplying with the down vector (Z-axis), and performing a corresponding calculation of the arctangent of the ratio of the Y-axis vector and the Z-axis vector (e.g., arctan(Y/Z)) may result in the third and fourth bump angle. These additional bump vectors or their components may be used by the heuristics engine to determine the position. For example, a first bump may have a strong +Y component, and the second bump may have no Y component or a strong −Y component, which may indicate that the mobile device may be located on the right side of the vehicle or its center of gravity.

Based on the determination of the position of the mobile device, one or more actions may be performed in step 880. These actions are similar to those discussed above with respect to FIGS. 6A and 6B and may include actions which configure the mobile device and/or the vehicle, such as providing a notification to the mobile device (e.g., displaying a warning on a display of the mobile device), deactivating a feature of the mobile device (e.g., disabling a text messaging application), providing a notification to the vehicle (e.g., displaying or enabling a visual or audio notification indicating that the mobile device has been detected in the area of the driver's seat and will be silenced while the vehicle is in motion), causing the activation or deactivation of a feature of the vehicle (e.g., enabling a BLUETOOTH transceiver, turning on lane assist functionality if disabled), transmitting a notification to a third party (e.g., transmitting a notification to an insurance service or insurance application indicating that a mobile device may be being used by a vehicle operator) and so on. Alternatively, other actions may be taken when the device is not located in the driver's area: for example, the activation or reactivation of features or the transmitting of a notification to a third party (e.g., transmitting a notification to an insurance service indicating that the vehicle operator is not using the mobile device).

The following discussion provides examples of implementations of the systems and methods described herein. They are merely some examples and are not intended to limit the systems and methods described herein.

In one example, one or more of the devices and systems described herein may determine a position of a smartphone mobile device within a vehicle interior. The smartphone may have an accelerometer, as discussed above, and may experience acceleration as one or more tires of the vehicles hit bumps in the road surface. Each time the vehicle hits a bump, the smartphone may move up or down, left or right, and/or frontwards or backwards (relative to the center of the vehicle). This movement may be examined as a single vector having a magnitude and angle. If the vehicle hits the same bump within a certain amount of time, hitting the second bump may cause different movement in the three axes, which may be combined into a second vector having a second magnitude and angle. The differences between the angles and the differences between the magnitudes of the vectors may be calculated; the result may be used to determine a position of the smartphone within the interior. For example, if the first magnitude is greater than the second magnitude, the smartphone may be closer to the tire where the first bump was felt. The calculated position may be translated to an estimated actual location within the vehicle (e.g., driver's seat, backseat, front passenger seat, trunk, glove compartment). In some aspects, this may be determining a quadrant of the vehicle based on the magnitude and angle: any vector resulting from the comparison which has positive magnitude towards the left of the vehicle may indicate the smartphone is in a left front quadrant, which may be a driver's seat in the United States, for example. Depending on where the estimated location is, smartphone functionality may be enabled or disabled. For example, if the device is near the driver's seat, the smartphone may disable text messaging applications, social media applications, and calling in a hand-held mode. Alternatively, the smartphone may enable hands-free mode. If the device is in a non-driver's seat quadrant, device functionality might not be disabled, as the position of the smartphone may indicate that a passenger is using the device. Instead of disabling functionality when the phone is in a non-driver's seat quadrant, a dismissible notification may be presented to the user indicating that the device should not be operated while driving. In some examples, the smartphone may send data to a vehicle computer to deter use of the smartphone, such as sending map or route data to a vehicle GPS receiver so the smartphone may be stored out of sight or reach. In some examples, the smartphone and/or the vehicle may transmit the data to a remote server.

In another example, accelerometer data from a smartphone may be compared to accelerometer data from an accelerometer located on the vehicle, such as in the interior or at a wheel. Again, when the vehicle hits a bump, both the vehicle and the smartphone may move up or down, left or right, and/or frontwards or backwards. Data from the bump as felt by the vehicle accelerometer may be compared to data from the bump as felt by the smartphone. Other information may be used as part of a heuristics calculation: for example, how many seatbelts are engaged, how much weight is in the front passenger seat, is the smartphone hearing a turn signal, what doors were opened before the vehicle was turned on, and so on. Based on the data from the accelerometers and the additional data, the device locating computing device may estimate the location of the smartphone within the interior. The estimated location may be transmitted to a remote server operated by an insurance provider for further processing and/or business decision-making, such as an adjusting of an insurance rate or sending an e-mail to the driver to practice safe driving habits.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A location analysis computing device comprising:
   a processing unit comprising at least one processor; and
   a memory unit storing computer-executable instructions, which when executed by the processing unit, cause the location analysis computing device to:
   receive vehicle sensor data collected by sensors of a vehicle, the vehicle sensor data comprising accelerometer data;
   detect a first occurrence of an event in the vehicle sensor data by determining that a first change in a magnitude of the accelerometer data exceeds a first predetermined threshold;
   receive mobile device sensor data collected by sensors of a mobile device located within the vehicle, the mobile device sensor data comprising further accelerometer data;
   detect a second occurrence of the event in the mobile device sensor data;
   calculate, based on the detected first occurrence of the event, a first occurrence vector comprising a first occurrence magnitude and a first occurrence angle;
   calculate, based on the detected second occurrence of the event, a second occurrence vector comprising a second occurrence magnitude and a second occurrence angle;
   compare the calculated first occurrence vector from the first occurrence of the event and the calculated second occurrence vector from the second occurrence of the event;
   determine, based on a difference between the calculated first occurrence vector and the calculated second occurrence vector meeting a second predetermined threshold, that a first tire of the vehicle and a second tire of the vehicle hit a same bump in a road; and
   determine, based on the comparison and determining that the first tire and the second tire hit the same bump, a position of the mobile device within the vehicle.

2. The location analysis computing device of claim 1, wherein comparing the calculated first occurrence vector and the calculated second occurrence vector comprises determining the difference between the calculated first occurrence vector and the calculated second occurrence vector, wherein the difference between the calculated first occurrence vector and the calculated second occurrence vector comprises a difference in the first occurrence magnitude and the first occurrence angle and the second occurrence magnitude and the second occurrence angle, respectively.

3. The location analysis computing device of claim 1, wherein comparing the calculated first occurrence vector from the first occurrence of the event and the calculated second occurrence vector from the second occurrence of the event comprises comparing a vector resulting from the first tire hitting the same bump in the road to a vector resulting from the second tire hitting the same bump in the road.

4. The location analysis computing device of claim 1, wherein the memory unit stores further computer-readable instructions which, when executed by the processing unit, cause the location analysis computing device to transmit, to a computing device other than the mobile device, an indication of the position of the mobile device.

5. The location analysis computing device of claim 1, wherein the memory unit stores further computer-readable instructions which, when executed by the processing unit, cause the location analysis computing device to:
   transmit, to the mobile device, a command configured to deactivate a functionality of the mobile device.

6. The location analysis computing device of claim 1, wherein detecting the second occurrence of the event comprises determining that a second change in a magnitude of the further accelerometer data exceeds a third predetermined threshold.

7. The location analysis computing device of claim 1, wherein determining, based on the comparison, the position of the mobile device within the vehicle comprises:
   determining, based on the comparison, an occurrence vector of the calculated first occurrence vector and the calculated second occurrence vector comprising a greater magnitude or a larger angle; and
   determining, based on the determined occurrence vector comprising the greater magnitude or the larger angle, the position of the mobile device within the vehicle.

8. A method comprising:
   receiving vehicle sensor data collected by sensors of a vehicle, the vehicle sensor data comprising accelerometer data;
   detecting a first occurrence of an event in the vehicle sensor data by determining that a first change in a magnitude of the accelerometer data exceeds a first predetermined threshold;
   receiving mobile device sensor data collected by sensors of a mobile device located within the vehicle, the mobile device sensor data comprising further accelerometer data;
   detecting a second occurrence of the event in the mobile device sensor data;
   calculating, based on the detected first occurrence of the event, a first occurrence vector comprising a first occurrence magnitude and a first occurrence angle;
   calculating, based on the detected second occurrence of the event, a second occurrence vector comprising a second occurrence magnitude and a second occurrence angle;
   comparing the calculated first occurrence vector from the first occurrence of the event and the calculated second occurrence vector from the second occurrence of the event;
   determining, based on a difference between the calculated first occurrence vector and the calculated second occurrence vector meeting a third predetermined threshold that a first tire of the vehicle and a second tire of the vehicle hit a same bump in the road; and
   determining, based on the comparison and determining that the first tire and the second tire hit the same bump, a position of the mobile device within the vehicle.

9. The method of claim 8, wherein comparing the calculated first occurrence vector and the calculated second occurrence vector comprises determining the difference between the calculated first occurrence vector and the calculated second occurrence vector, wherein the difference between the calculated first occurrence vector and the calculated second occurrence vector comprises a difference in the first occurrence magnitude and the first occurrence angle and the second occurrence magnitude and the second occurrence angle, respectively.

10. The method of claim 8,
   wherein comparing the calculated first occurrence vector from the first occurrence of the event and the calculated second occurrence vector from the second occurrence of the event comprises comparing a vector resulting from the first tire hitting the same bump in the road to a vector resulting from the second tire hitting the same bump in the road.

11. The method of claim 8, further comprising:
   transmitting, to a computing device other than the mobile device, an indication of the position of the mobile device.

12. The method of claim 8, further comprising:
   transmitting, to the mobile device, a command configured to deactivate a functionality of the mobile device.

13. The method of claim 8, wherein detecting the second occurrence of the event comprises determining that a second change in a magnitude of the further accelerometer data exceeds a third predetermined threshold.

14. The method of claim 8, wherein determining, based on the comparison, the position of the mobile device within the vehicle comprises:
   determining, based on the comparison, an occurrence vector of the calculated first occurrence vector and the calculated second occurrence vector comprising a greater magnitude or a larger angle; and
   determining, based on the determined occurrence vector comprising the greater magnitude or the larger angle, the position of the mobile device within the vehicle.

15. A non-transitory, computer-readable storage medium storing instructions, which when executed by a processor of a computing device, cause the computing device to:
   receive vehicle sensor data collected by sensors of a vehicle, the vehicle sensor data comprising accelerometer data;
   detect a first occurrence of an event in the translated vehicle sensor data by determining that a first change in a magnitude of the accelerometer data exceeds a first predetermined threshold;
   receive mobile device sensor data collected by sensors of a mobile device located within the vehicle, the mobile device sensor data comprising further accelerometer data;
   detect a second occurrence of the event in the mobile device sensor data;
   calculate, based on the detected first occurrence of the event, a first occurrence vector comprising a first occurrence magnitude and a first occurrence angle;
   calculate, based on the detected second occurrence of the event, a second occurrence vector comprising a second occurrence magnitude and a second occurrence angle;
   compare the calculated first occurrence vector from the first occurrence of the event and the calculated second occurrence vector from the second occurrence of the event;
   determine, based on a difference between the calculated first occurrence vector and the calculated second occurrence vector meeting a third predetermined threshold, that a first tire of the vehicle and a second tire of the vehicle hit a same bump in the road; and
   determine, based on the comparison and determining that the first tire and the second tire hit the same bump, a position of the mobile device within the vehicle.

16. The non-transitory, computer-readable storage medium of claim 15, wherein comparing the calculated first occurrence vector and the calculated second occurrence vector comprises determining the difference between the calculated first occurrence vector and the calculated second occurrence vector, wherein the difference between the calculated first occurrence vector and the calculated second occurrence vector comprises a difference in the first occurrence magnitude and the first occurrence angle and the second occurrence magnitude and the second occurrence angle, respectively.

17. The non-transitory, computer-readable storage medium of claim 15, wherein comparing the calculated first occurrence vector from the first occurrence of the event and the calculated second occurrence vector from the second occurrence of the event comprises comparing a vector resulting from the first tire hitting the same bump in the road to a vector resulting from the second tire hitting the same bump in the road.

18. The non-transitory, computer-readable storage medium of claim 15, storing further instructions which, when executed by the processor of the computing device, cause the computing device to:
 transmit, to the mobile device, a command configured to deactivate a functionality of the mobile device.

\* \* \* \* \*